(12) United States Patent
Lim

(10) Patent No.: US 12,477,242 B2
(45) Date of Patent: Nov. 18, 2025

(54) IMAGE SENSOR HAVING WIDE DYNAMIC RANGE BASED ON PIXELS WITH PLURALITY OF PHOTOELECTRIC CONVERSION ELEMENTS, OPERATING METHOD OF THE SAME AND ELECTRONIC DEVICE

(71) Applicant: SAMSUNG ELECTRONICS CO., LTD., Suwon-si (KR)

(72) Inventor: Jungwook Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 169 days.

(21) Appl. No.: 18/525,211

(22) Filed: Nov. 30, 2023

(65) Prior Publication Data

US 2024/0406591 A1 Dec. 5, 2024

(30) Foreign Application Priority Data

Jun. 5, 2023 (KR) .......................... 10-2023-0072215

(51) Int. Cl.
*H04N 25/59* (2023.01)
*H04N 23/667* (2023.01)
*H04N 25/51* (2023.01)
*H04N 25/581* (2023.01)
*H04N 25/703* (2023.01)
(Continued)

(52) U.S. Cl.
CPC ........... *H04N 25/59* (2023.01); *H04N 23/667* (2023.01); *H04N 25/51* (2023.01); *H04N 25/77* (2023.01); *H10F 39/8023* (2025.01)

(58) Field of Classification Search
CPC ........ H04N 25/59; H04N 25/77; H04N 25/51; H04N 23/667; H04N 25/581; H04N 25/703; H04N 25/76; H10F 39/8023; H10F 39/813

See application file for complete search history.

(56) References Cited

U.S. PATENT DOCUMENTS 9,305,949 B2    4/2016  Chen et al.
9,590,007 B2    3/2017  Wakano et al.
(Continued)

FOREIGN PATENT DOCUMENTS

KR    10-2022-0145783 A    10/2022

*Primary Examiner* — Marly S Camargo
(74) *Attorney, Agent, or Firm* — Sughrue Mion, PLLC

(57) ABSTRACT

Disclosed is an image sensor. The image sensor includes a plurality of pixels, one of which includes: a driving transistor; a first switching transistor; a first photoelectric conversion element group with first photoelectric conversion elements; a second photoelectric conversion element group with at least one second photoelectric conversion element; a first floating diffusion region connected to the first photoelectric conversion elements through a first transfer transistor; a second floating diffusion region connected to the at least one second photoelectric conversion element through a second transfer transistor; a third floating diffusion region connected to a gate of the driving transistor, and separated from each of the first floating diffusion region and the second floating diffusion region by the first switching transistor; and a reset transistor with a first end to which a reset voltage is applied and a second end connected to the third floating diffusion region.

20 Claims, 19 Drawing Sheets

(51) Int. Cl.
  *H04N 25/76*    (2023.01)
  *H04N 25/77*    (2023.01)
  *H10F 39/00*    (2025.01)

(56) References Cited

U.S. PATENT DOCUMENTS

| | | |
|---|---|---|
| 9,871,065 B2 | 1/2018 | Wan et al. |
| 11,350,044 B2 | 5/2022 | Mori et al. |
| 11,527,569 B2 | 12/2022 | Mao et al. |
| 11,849,338 B2 * | 12/2023 | Park .................... H04N 25/134 |
| 11,950,011 B2 * | 4/2024 | Lim .................... H04N 25/773 |
| 2022/0123033 A1 | 4/2022 | Park et al. |
| 2022/0345648 A1 | 10/2022 | Elizov et al. |
| 2022/0399384 A1 * | 12/2022 | Cho .................... H10F 39/811 |
| 2024/0430587 A1 * | 12/2024 | Lim .................... H04N 25/778 |
| 2025/0221064 A1 * | 7/2025 | Cho .................... H10F 39/811 |

\* cited by examiner

IMAGE SENSOR HAVING WIDE DYNAMIC RANGE BASED ON PIXELS WITH PLURALITY OF PHOTOELECTRIC CONVERSION ELEMENTS, OPERATING METHOD OF THE SAME AND ELECTRONIC DEVICE

CROSS-REFERENCE TO RELATED APPLICATION

This application claims priority to Korean Patent Application No. 10-2023-0072215, filed on Jun. 5, 2023, in the Korean Intellectual Property Office, the disclosure of which is incorporated by reference herein in its entirety.

BACKGROUND

The present disclosure relates to an image sensor having a wide dynamic range.

An image sensor is a device that converts a light signal into an electrical signal, and may include includes a charge coupled device (CCD) image sensor or a complementary metal oxide semiconductor (CMOS) image sensor.

Among the CMOS image sensors, an active pixel sensor (APS) transfers electric charges generated when the light signal is incident on a photodiode (PD) to a floating diffusion region and converts them into image signals.

Image sensors are being developed in a direction of improving a dynamic range to improve image quality in various illumination environments while reducing the size of a pixel to increase resolution.

There are various technologies for realizing high dynamic range (HDR) of image sensors, and one of the technologies is a split photodiode pixel technology in which a plurality of photodiodes having different light receiving areas are configured as pixels.

SUMMARY

One or more example embodiments provide an image sensor with an improved dynamic range.

According to an aspect of an example embodiment, an image sensor includes: a pixel array in which a plurality of pixels are arranged. A first pixel of the plurality of pixels includes: a driving transistor; a first switching transistor; a first photoelectric conversion element group including a plurality of first photoelectric conversion elements; a second photoelectric conversion element group including at least one second photoelectric conversion element; a first floating diffusion region connected to the plurality of first photoelectric conversion elements through a first transfer transistor; a second floating diffusion region connected to the at least one second photoelectric conversion element through a second transfer transistor; a third floating diffusion region connected to a gate of the driving transistor, and separated from each of the first floating diffusion region and the second floating diffusion region by the first switching transistor; and a reset transistor including a first end to which a reset voltage is applied and a second end connected to the third floating diffusion region. The driving transistor is configured to output an image signal based on a voltage of the third floating diffusion region through a selection transistor.

According to an aspect of an example embodiment, a method of operating a pixel including a first photoelectric conversion element group and a second photoelectric conversion element group, a first floating diffusion region and a second floating diffusion region respectively connected to the first photoelectric conversion element group and the second photoelectric conversion element group, and a third floating diffusion region separated from the first floating diffusion region and the second floating diffusion region and connected to a gate of a driving transistor, wherein a number of photoelectric conversion elements in the first photoelectric conversion element group is greater than a number of photoelectric conversion elements in the second photoelectric conversion element group, is provided. The method includes: resetting the first floating diffusion region and the third floating diffusion region; sampling a first reset level of a voltage of the third floating diffusion region while controlling a first switching transistor positioned between the first floating diffusion region and the third floating diffusion region to couple the first floating diffusion region and the third floating diffusion region; sampling a second reset level of a voltage of the third floating diffusion region while controlling the first switching transistor to not couple the first floating diffusion region and the second floating diffusion region; sampling a first image signal level of a voltage of the third floating diffusion region while controlling the first switching transistor to couple the first floating diffusion region and the third floating diffusion region in a first output period based on electric charge generated by the first photoelectric conversion element group; sampling a second image signal level of a voltage of the third floating diffusion region while controlling the first switching transistor to not couple the first floating diffusion region and the third floating diffusion region in a second output period; and sampling a third reset level and a third image signal level associated with the second photoelectric conversion element group.

According to an aspect of an example embodiment, an electronic device includes: a pixel array in which a plurality of pixels are arranged; and a controller configured to transmit a control signal to a plurality of transistors in the plurality of pixels. A first pixel of the plurality of pixels includes: a driving transistor; a first switching transistor; a plurality of photoelectric conversion element groups including different numbers of photoelectric conversion elements; a first floating diffusion region connected to a first photoelectric conversion element group through a first transfer transistor; a second floating diffusion region connected to a second photoelectric group through a second transfer transistor; a third floating diffusion region connected to a gate of the driving transistor, separated from the first floating diffusion region, separated from the second floating diffusion region, by the first switching transistor; and a reset transistor including a first end to which a reset voltage is applied and a second end connected to the third floating diffusion region. The driving transistor is configured to output an image signal based on a voltage of the third floating diffusion region through a selection transistor.

BRIEF DESCRIPTION OF DRAWINGS

The above and other aspects and features will be more apparent from the following description of example embodiments, taken in conjunction with the accompanying drawings, in which.

DETAILED DESCRIPTION

Hereinafter, example embodiments are described in conjunction with the accompanying drawings. Embodiments described herein are example embodiments, and thus, the present disclosure is not limited thereto, and may be realized in various other forms. Each example embodiment provided in the following description is not excluded from being associated with one or more features of another example or another example embodiment also provided herein or not provided herein but consistent with the present disclosure. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. It will be also understood that, even if a certain step or operation of manufacturing an apparatus or structure is described later than another step or operation, the step or operation may be performed later than the other step or operation unless the other step or operation is described as being performed after the step or operation.

Figure 1:
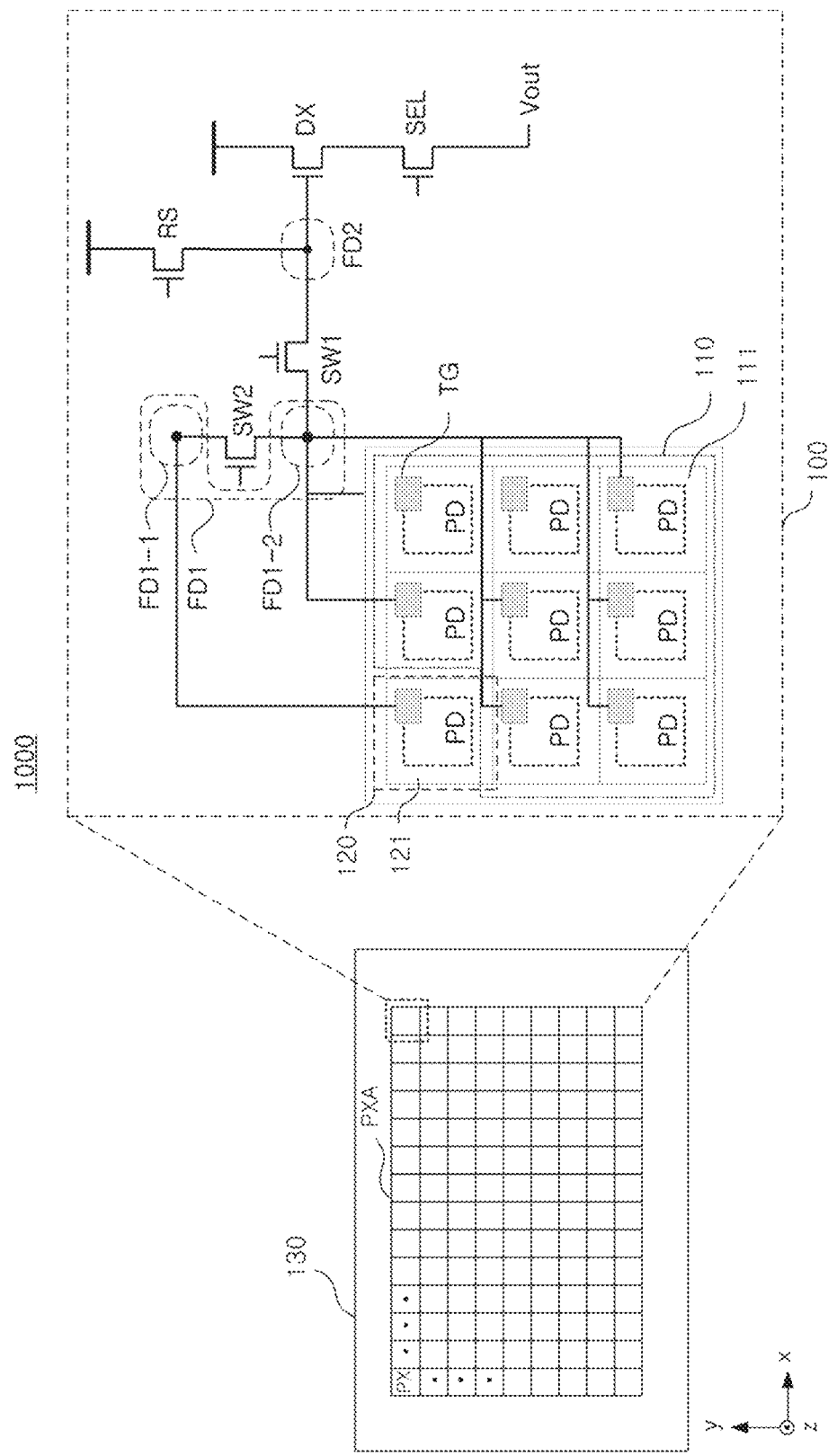
FIG. 1 is a diagram illustrating a pixel of an image sensor according to an example embodiment.

FIG. 1 is a diagram illustrating an image sensor 1000 according to an example embodiment.

The image sensor 1000 according to an example embodiment includes a plurality of photoelectric conversion element groups 110 and 120 including different numbers of photoelectric conversion elements. The plurality of photoelectric conversion element groups 110 and 120 are connected to different first floating diffusion regions FD1-1 and FD1-2 (FD1=FD1-1 and FD1-2) through transfer transistors, respectively. Charges of each of the first floating diffusion regions FD1-1 and FD1-2 are transferred to a second floating diffusion region FD2 separated by a switching transistor SW1, and may be output as an image signal Vout by a driving transistor DX.

The first floating diffusion region FD1 connected to the plurality of photoelectric conversion element groups 110 and 120 of the image sensor 1000 through transfer transistors is separated from the second floating diffusion region FD2 connected to the driving transistor DX for outputting the image signal Vout. Accordingly, the image signal Vout may be output in a high conversion gain (HCG) mode and a low conversion gain (LCG) mode even when the image signal Vout of the photoelectric conversion element groups including a plurality of photoelectric conversion elements is output. Depending on whether the HCG mode or the LCG mode is set, in a state in which at least one of the plurality of first floating diffusion regions FD1-1 and FD1-2 is coupled or not coupled to the second floating diffusion region FD2, the image signal Vout may be output.

Referring to FIG. 1, the image sensor 1000 according to an example embodiment will be described in detail. The image sensor 1000 includes a pixel array PXA in which a plurality of pixels 100 are arranged. The pixel 100 includes the plurality of photoelectric conversion element groups 110 and 120, the plurality of floating diffusion regions FD1 and FD2, at least one driving transistor DX, at least one selection transistor SEL, and at least one reset transistor RS.

The pixel array PXA is formed in an active region of a substrate 130. When the substrate 130 is a p-type substrate, photoelectric conversion elements of the photoelectric conversion element groups 110 and 120 may be formed together with a region doped with an n-type impurity. In this case, the photoelectric conversion element may be referred to as an element having a region doped with an n-type impurity.

The photoelectric conversion element is a photodiode PD. The photodiode PD is a kind of photoelectric conversion element that generates charges in proportion to an incident light signal from the outside and accumulates the generated charges. The photoelectric conversion element may be any one of the photodiode PD, a photocapacitor, a photogate, a pinned photodiode PPD, and a partially pinned photodiode, or a combination thereof. Example embodiments are described on the premise that the photoelectric conversion element is the photodiode PD, but other photoelectric conversion elements described above may be used and the photoelectric conversion element is not limited to the photodiode PD.

The substrate 130 may be a substrate having a conductivity type different from that of the photodiode PD. For example, the substrate 130 may be a p-type bulk silicon substrate on which a p-type epitaxial layer is formed, and the photodiode PD may be doped with n-type impurities in an n-type doped region. The photodiode PD may be formed on the p-type epitaxial layer, and a bulk silicon substrate may be removed from the substrate 130. In another example embodiment, a p-type epitaxial layer may be formed on an n-type bulk silicon, and an n-type doped region constituting the photodiode PD may be formed in the epitaxial layer.

In another example embodiment, the substrate 130 may include p-type well regions where n-type doped regions are located. Alternatively, the substrate 130 may be a silicon on insulator (SOI) substrate.

The image sensor 1000 includes a plurality of pixels PX, and the pixels PX may be arranged in a 2D array structure to form the pixel array PXA. The pixel array PXA may include the pixels PX disposed along a first direction (x direction) and a second direction (y direction) parallel to a front surface FS of the substrate 130. The substrate 130 has a back surface BS opposite to the front surface FS, and an area between the front surface FS and the back surface BS of the substrate 130 may form the inside of the substrate 130 along a third direction (z direction) perpendicular to the first and second directions.

Pixels according to example embodiments will be described on the premise that a back side illumination (BSI) method in which light signals are incident through the back surface BS of the substrate 130 is applied.

The pixel 100 according to an example embodiment includes a plurality of photodiodes PD, a plurality of transfer transistors TX, and a plurality of floating diffusion regions, may be a 4T (4 transistors) structure including the reset transistor RS, the driving transistor DX, and a selection transistor SEL, and may be any one structure among 5T, 6T, and 7T structures including other transistors.

The transfer transistor TX, the driving transistor DX, the reset transistor RS, and the selection transistor SEL may be formed on the front surface FS of the substrate 130 or may be formed adjacent to the front surface FS.

The photodiode PD or the floating diffusion region may function as a source or drain node of the transfer transistor TX, and in this case, the transfer transistor TX may be a transfer gate TG. For example, as the photodiode PD operates as a source node, and when the transfer transistor TX is turned on, charges accumulated in the photodiode PD may be transferred to a floating diffusion region FD which is the drain node.

Example embodiments will be described on the premise that the photodiode PD or the floating diffusion region functions as the source node or the drain node of the transfer transistor TX, and the transfer transistor TX is the transfer gate TG.

The photodiode PD generates different amount of charges depending on the light intensity. Accordingly, the amount of charges generated by the photodiode PD is variable depending on the light intensity.

The pixel PX according to an example embodiment includes the plurality of photoelectric conversion element groups 110 and 120. The plurality of photoelectric conversion element groups 110 and 120 may include the first photoelectric conversion element group 110 and the second photoelectric conversion element group 120. Each of the photoelectric conversion element groups 110 and 120 includes at least one photodiode PD. The number of photodiodes PD included in the first photoelectric conversion element group 110 is different from the number of photodiodes PD included in the second photoelectric conversion element group 120. For example, the number of photodiodes PD included in the first photoelectric conversion element group 110 may be greater than the number of photodiodes PD included in the second photoelectric conversion element group 120.

The photodiodes PD of the first photoelectric conversion element group 110 and the second photoelectric conversion element group 120 are exposed to incident light at the same time.

The first photoelectric conversion element group 110 according to an example embodiment includes the plurality of photodiodes PD, and the second photoelectric conversion element group 120 includes at least one photodiode PD. As described below in detail with reference to FIGS. 6 and 7, the photodiode PD, the transfer gate TG, and at least one transistor of each photoelectric conversion element group 110 or 120 may form a unit body. The unit body may be referred to as a sub-pixel in this specification. A transistor of at least one sub-pixel may be a dummy transistor that is not electrically connected and has only a transistor shape. The number of sub-pixels 111 included in the first photoelectric conversion element group 110 is different from the number of sub-pixels 121 included in the second photoelectric conversion element group 120.

In the image sensor 1000 according to an example embodiment described with reference to FIG. 1, the pixel PX is described as being composed of 9 sub-pixels, the first photoelectric conversion element group 110 is described as being composed of 8 sub-pixels, and the second photoelectric conversion element group 120 is described as being composed of one sub-pixel. However, the present disclosure does not exclude that the number of sub-pixels constituting the first photoelectric conversion element group 110 and the second photoelectric conversion element group 120, including other example embodiments described below, may be implemented differently.

The pixel PX according to an example embodiment includes the plurality of photoelectric conversion element groups 110 and 120, and charges generated by the first photoelectric conversion element group 110 and the second photoelectric conversion element group 120 may be used for a conversion gain related to incident lights of different illuminances of the pixel PX.

The charges generated by the first photoelectric conversion element group 110 may be used for a conversion gain related to incident lights having a lower illuminance than that of the second photoelectric conversion element group 120. For example, the first photoelectric conversion element group 110 may be applied to a low luminance region of incident light, and the second photoelectric conversion element group 120 may be applied to a high luminance region of incident light.

Among technologies supporting high dynamic range (HDR), a related split photodiode pixel is composed of one big photodiode and one small photodiode having different light receiving areas. In a related split photodiode pixel, a sensitivity ratio of the big photodiode and the small photodiode is based on the light receiving areas of the big photodiode and the small photodiode. Therefore, related split photodiode pixels have limitations in reducing the pixel size while maintaining the high conversion gain of the big photodiode, and as a result, it is difficult to increase the total number of pixels of the image sensor.

Unlike this, the pixel PX according to an example embodiment includes the plurality of photoelectric conversion element groups 110 and 120, the first photoelectric conversion element group 110 includes the plurality of photodiodes PD, and the second photoelectric conversion element group 120 includes at least one photodiode PD. The sum of the light receiving areas of each photodiode PD of the first photoelectric conversion element group 110 is greater than the sum of the light receiving areas of each photodiode PD of the second photoelectric conversion element group 120. The first photoelectric conversion element group 110 may operate to react more sensitively at low intensity of incident light than the second photoelectric conversion element group 120.

One (e.g., FD1-1) of the plurality of first floating diffusion regions FD1 is connected to the first photoelectric conversion element group 110 through the transfer gates TG, and the other one (e.g., FD1-2) is connected to the second photoelectric conversion element group 120 through the transfer gates TG.

Accordingly, because the pixel PX according to an example embodiment includes the plurality of photoelectric conversion element groups 110 and 120, and each of the photoelectric conversion element groups 110 and 120 includes a different number of photodiodes PD, the dynamic range of the pixel PX may be improved and also the size of the pixel PX may be reduced.

The charges accumulated in the photodiode PD are transferred to the first floating diffusion region FD1 by the transfer gate TG after light exposure. The transfer gate TG is formed parallel to the front surface FS of the substrate 130, or may be a vertical gate in which a protrusion extends from the front surface FS of the substrate 130 to the inside of the substrate 130 perpendicularly to the front surface FS.

When the transfer gate TG is a vertical gate, the transfer gate TG may include a plurality of protrusions extending into the substrate 130. The first floating diffusion region FD1 may be disposed on an upper region of the substrate 130 adjacent to the vertical gate in a direction parallel to the front surface FS of the substrate 130. A portion of a channel through which charges are transferred from the photodiode PD may be formed between the plurality of protrusions of the vertical gate.

The pixel PX according to an example embodiment includes the plurality of floating diffusion regions FD1 and FD2. The plurality of floating diffusion regions FD1 and FD2 include the first floating diffusion region FD1 and the second floating diffusion region FD2. The first floating diffusion region FD1 includes the plurality of regions FD1-1 and FD1-2. The first floating diffusion regions FD1-1 and FD1-2 and the second floating diffusion region FD2 are separated from each other. For example, the pixel PX may include a switching element SW1 between the first floating diffusion regions FD1-1 and FD1-2 and the second floating diffusion region FD2. The switching element SW1 may be implemented as a switching transistor.

The first floating diffusion regions FD1-1 and FD1-2 are connected to the photodiodes PD of the first photoelectric conversion element group 110 and the second photoelectric conversion element group 120 through the transfer gates TG. The first floating diffusion regions FD1-1 and FD1-2 receive the charges generated by the photodiodes PD of the first photoelectric conversion element group 110 and the second photoelectric conversion element group 120, respectively. The second floating diffusion region FD2 is connected to the gate of the driving transistor DX, and the image signal Vout is output based on the voltage of the second floating diffusion region FD2. The reset transistor RS has one end to which a reset voltage is applied and the other end connected to the second floating diffusion region FD2.

The first floating diffusion region FD1 may include a plurality of regions. Each of the photoelectric conversion element groups 110 and 120 is connected to a different first floating diffusion region FD1-1 or FD1-2 among the plurality of first floating diffusion regions FD1-1 and FD1-2. Each of the photodiodes PD of the photoelectric conversion element groups 110 and 120 is connected to one of the plurality of first floating diffusion regions FD1-1 and FD1-2 through an individual transfer gate.

Charges from the plurality of photodiodes PD of the first photoelectric conversion element group 110 are transferred to the first floating diffusion region FD1-1 in one period of a read-out mode through the transfer gate TG. Charges from at least one photodiode PD of the second photoelectric conversion element group 120 are transferred to the second floating diffusion region FD1-2 in another period of the read-out mode through the transfer gate TG.

One end of the driving transistor DX is connected to a pixel power source Vpix and the other end of the driving transistor DX is connected to the selection transistor SEL. The driving transistor DX may operate as a source follower based on a bias current generated by a current source connected to an output line (e.g., a column line). The reset transistor RS may be connected to the pixel power source Vpix or a separate reset power source Vres. The reset power source Vres may be a power source of the same voltage supplied from the same circuit as the pixel power source Vpix. Alternatively, the reset power source Vres may be a power source having the same voltage or a different voltage supplied from a circuit separate from the pixel power source Vpix.

The driving transistor DX according to an example embodiment may output a voltage corresponding to the voltage of the second floating diffusion region FD2 as the image signal Vout through the selection transistor SEL. Based on the operation of the switching transistors SW1 and SW2, the image signal Vout may be based on the voltage of the second floating diffusion region FD2 in a state in which at least one of the first floating diffusion regions FD1-1 and FD1-2 is coupled, or may be based on the voltage of the second floating diffusion region FD2 in a state in which the first floating diffusion regions FD1-1 and FD1-2 are not coupled.

In detail, in the pixel PX according to example embodiments, the first floating diffusion regions FD1-1 and FD1-2, to which charges are respectively transferred from the photoelectric conversion element groups 110 and 120 through the transfer gate TG, are separated from the second floating diffusion region FD2 which is converted to the image signal Vout by the driving transistor DX.

When the floating diffusion region is connected to a plurality of sub-pixels and a plurality of transfer gates, a large parasitic capacitance may occur due to the plurality of connected metal wires. The first floating diffusion regions FD1-1 and FD1-2 to which charges are transferred from the photodiodes PD are separated from the second floating diffusion region FD2 to which the image signal is converted. As a result, a high conversion gain may be applied to the image signal of the first photoelectric conversion element group 110 including the plurality of sub-pixels 111. As in the above description, even when the second photoelectric conversion element group 120 includes the plurality of sub-pixels 121, a high conversion gain may be applied to the image signal of the second photoelectric conversion element group 120. Therefore, the dynamic range of a pixel may be improved.

Figure 2:
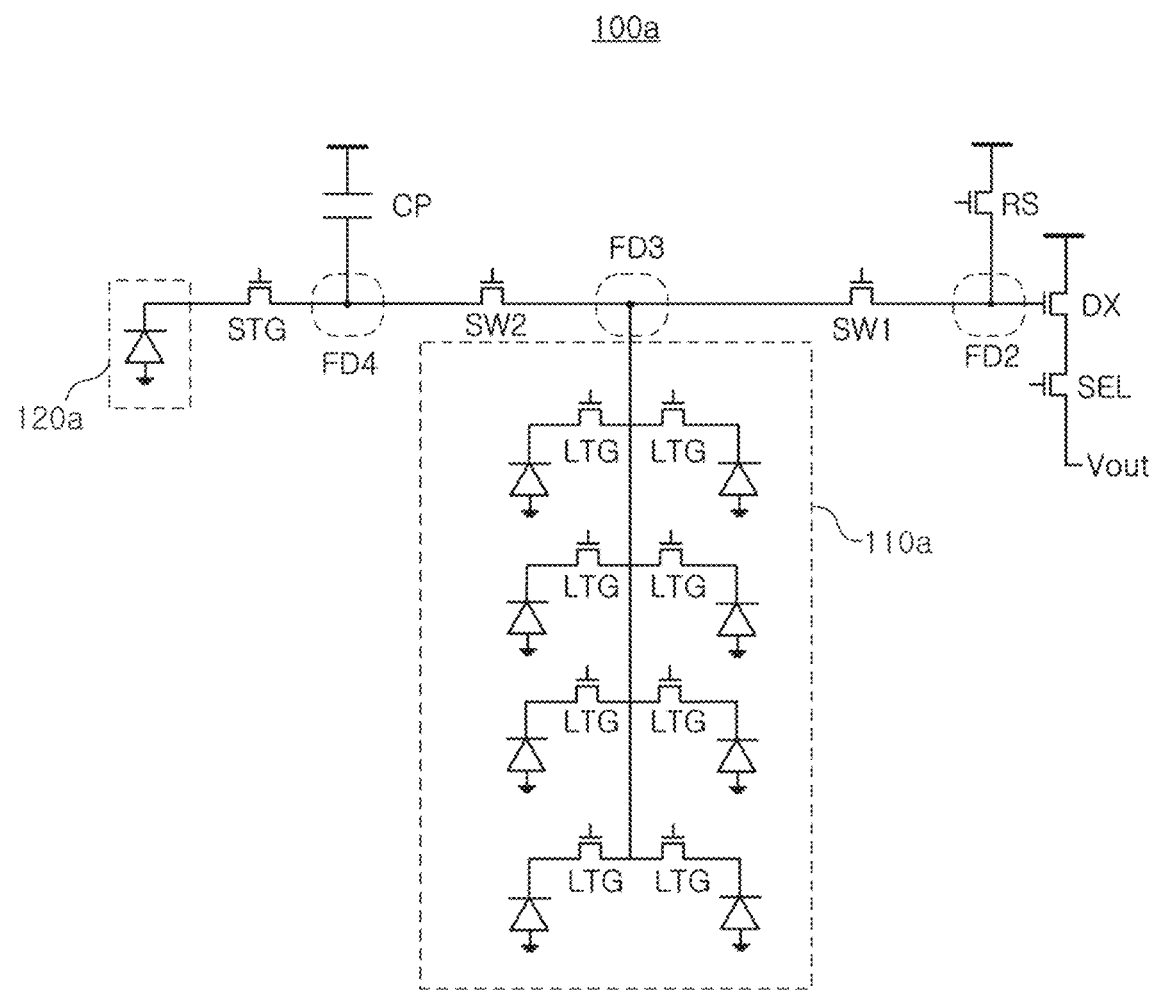
FIG. 2 is a circuit diagram of a pixel of an image sensor according to an example embodiment.

FIG. 2 is a circuit diagram of a pixel 100a of an image sensor according to an example embodiment.

With reference to FIG. 2, the pixel 100a of the image sensor according to an example embodiment will be described in detail. The pixel 100a of the image sensor includes a first photoelectric conversion element group 110a, a second photoelectric conversion element group 120a, a plurality of first floating diffusion regions FD3 and FD4, the second floating diffusion region FD2, the reset transistor RS, the driving transistor DX, the selection transistor SEL, the plurality of switching elements SW1 and SW2, and a charge storage element CP. Additional descriptions of overlapping or similar parts to those described above will be omitted to avoid redundancy.

In an example embodiment illustrated in FIG. 2, the pixel 100a is described as being composed of 9 sub-pixels, the first photoelectric conversion element group 110a is described as being composed of 8 sub-pixels, and the second photoelectric conversion element group 120a is described as being composed of one sub-pixel.

The switching elements SW1 and SW2 may be implemented as switching transistors.

The first floating diffusion region FD1 according to an example embodiment includes the third floating diffusion region FD3 and the fourth floating diffusion region FD4, which are the plurality of floating diffusion regions. The third floating diffusion region FD3 is connected to the first photoelectric conversion element group 110a through a transfer gate LTG. The fourth floating diffusion region FD4 is connected to the second photoelectric conversion element group 120a through a transfer gate STG.

The first photoelectric conversion element group 110a according to an example embodiment includes a plurality of photodiodes. Each of the plurality of photodiodes of the first photoelectric conversion element group 110a is connected to the third floating diffusion region FD3 through an individual transfer gate LTG. A plurality of transfer gates LTG, respectively corresponding to the plurality of photodiodes of the first photoelectric conversion element group 110a, are controlled by the same control signal. Accordingly, the plurality of photodiodes of the first photoelectric conversion element group 110a transfer charges to the third floating diffusion region FD3 in response to the same control signal in the same period during a read-out mode of the pixel.

The second floating diffusion region FD2 is connected to the gate of the driving transistor DX and the reset transistor RS.

The second floating diffusion region FD2 according to an example embodiment is separated from the third floating diffusion region FD3 and the fourth floating diffusion region FD4. Referring to FIG. 2, the second floating diffusion region FD2 is separated from the third floating diffusion region FD3 by the first switching transistor SW1, and is separated from the fourth floating diffusion region FD4 by the first switching transistor SW1 and the second switching transistor SW2.

As may be seen in FIG. 2, because the third floating diffusion region FD3 is connected to the plurality of photodiodes of the first photoelectric conversion element group 110a through the transfer gate LTG, high parasitic capacitance may occur due to being connected to multiple metal wires. Therefore, in the HCG mode of the first photoelectric conversion element group 110a outputting the image signal of the first photoelectric conversion element group 110a with a high conversion gain, the charges transferred to the third floating diffusion region FD3 are moved to the second floating diffusion region FD2 based on the operation of the first switching transistor SW1, and then are output as the image signal Vout by the driving transistor DX. While the image signal in an HCG mode of the first photoelectric conversion element group 110a is output, the second floating diffusion region FD2 is not coupled to the third floating diffusion region FD3 or the fourth floating diffusion region FD4.

Accordingly, the image signal of the first photoelectric conversion element group 110a including a plurality of photodiodes may be output with a high conversion gain.

In the LCG mode of the first photoelectric conversion element group 110a, charges transferred to the second floating diffusion region FD2 are output as the image signal Vout by the driving transistor DX after capacitances of the third floating diffusion region FD3 and the second floating diffusion region FD2 are coupled again, based on the operation of the first switching transistor SW1.

Accordingly, the output of the first photoelectric conversion element group 110a may be output with a high conversion gain or a low conversion gain selectively applied based on the operation of the first switching transistor SW1. As a result, the dynamic range of the pixel 100a may be improved.

The second switching transistor SW2 connects the third floating diffusion region FD3 to the fourth floating diffusion region FD4. The second switching transistor SW2 is turned off in the read-out mode of the first photoelectric conversion element group 110a. The second switching transistor SW2 is turned on during at least one period of the read-out mode of the second photoelectric conversion element group 120a.

The fourth floating diffusion region FD4 is connected to the charge storage element CP. The charge storage element CP may be a capacitor. The charge storage element CP may be an in-pixel capacitor located in a pixel. The charge storage element CP may be implemented as an in-pixel capacitor inside the substrate 130 at a position spaced apart from the front surface FS of the substrate 130 in a vertical direction. One electrode of the charge storage element CP may be connected to the fourth floating diffusion region FD4, and the other electrode of the charge storage element CP may be connected to the pixel power source Vpix or a separate capacitor power source Vcap. The capacitor power source Vcap may be a power supply of the same voltage supplied from the same circuit as the pixel power source Vpix. Alternatively, the capacitor power source Vcap may be a power supply having the same voltage or a different voltage supplied from a circuit separate from the pixel power source Vpix.

The charge storage element CP may store charges overflowed from the photodiode of the second photoelectric conversion element group 120a in a high-illuminance environment. Therefore, the dynamic range of a pixel may be improved.

The charge storage element CP is coupled to the capacitance of the fourth floating diffusion region FD4.

Figure 3:
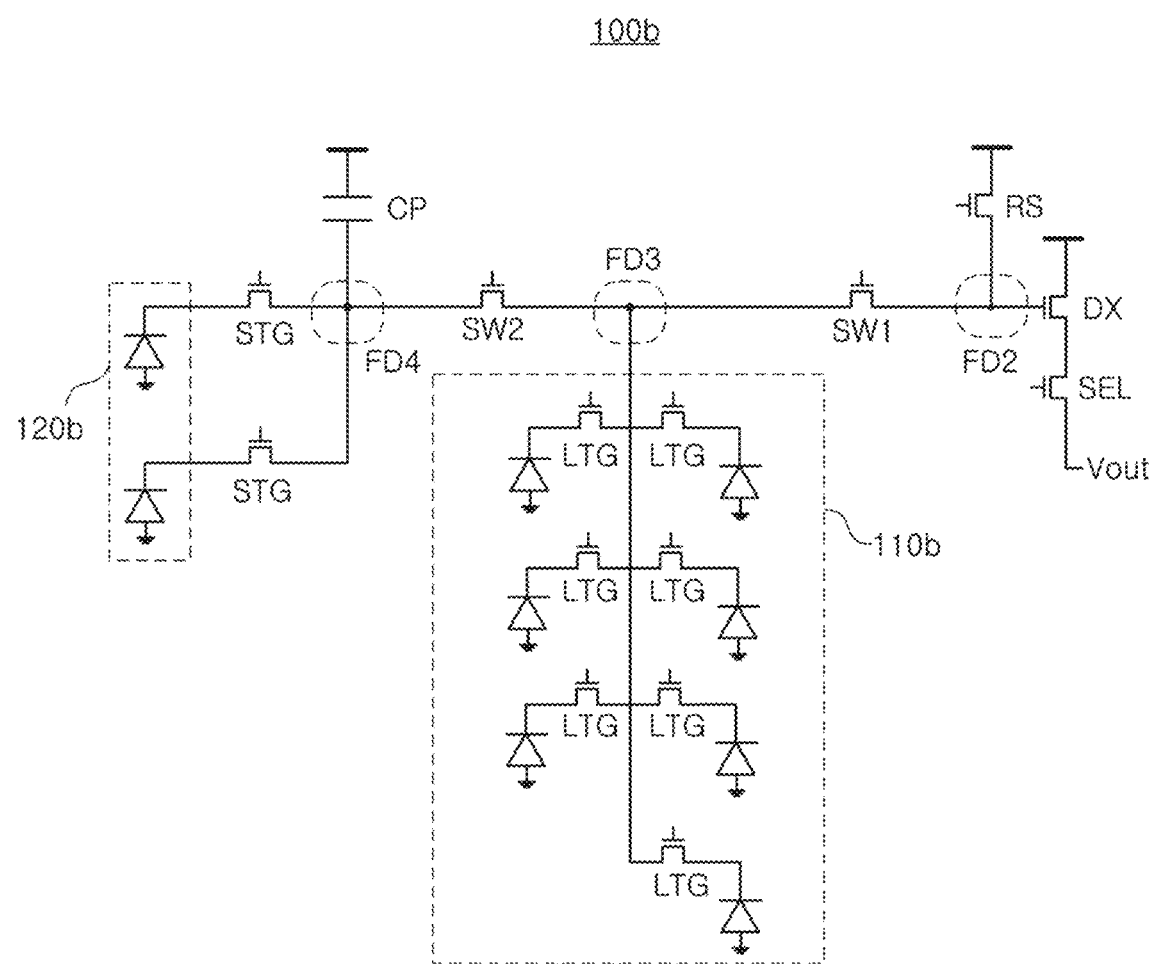
FIG. 3 is a circuit diagram of a pixel of an image sensor according to an example embodiment.

FIG. 3 is a circuit diagram of a pixel 100b of an image sensor according to an example embodiment.

With reference to FIG. 3, the pixel 100b of the image sensor according to an example embodiment will be described in detail. The pixel 100b of the image sensor according to an example embodiment includes a first photoelectric conversion element group 110b, a second photoelectric conversion element group 120b, the plurality of first floating diffusion regions FD3 and FD4, the second floating diffusion region FD2, the reset transistor RS, the driving transistor DX, the selection transistor SEL, the plurality of switching elements SW1 and SW2, and the charge storage element CP. Additional descriptions of overlapping or similar parts to those described above will be omitted to avoid redundancy.

In an example embodiment illustrated in FIG. 3, the pixel 100b is described as being composed of 9 sub-pixels, the first photoelectric conversion element group 110b is described as being composed of 7 sub-pixels, and the second photoelectric conversion element group 120b is described as being composed of 2 sub-pixels. In detail, the second photoelectric conversion element group 120b includes a plurality of photodiodes. The two sub-pixels of the second photoelectric conversion element group 120b is an example, and the second photoelectric conversion element group 120b includes a plurality of photodiodes that are smaller in number than the photodiodes of the first photoelectric conversion element group 110b.

The first floating diffusion region according to an example embodiment includes the third floating diffusion region FD3 and the fourth floating diffusion region FD4, which are the plurality of floating diffusion regions.

In the pixel 100b according to an example embodiment, the second floating diffusion region FD2 is not coupled to the third floating diffusion region FD3 in the HCG mode of the first photoelectric conversion element group 110b. In the LCG mode of the first photoelectric conversion element group 110b, the second floating diffusion region FD2 is coupled to the third floating diffusion region FD3.

Accordingly, the output of the first photoelectric conversion element group 110b may be output with a high conversion gain or a low conversion gain selectively applied based on the operation of the first switching transistor SW1. As a result, the dynamic range of the pixel 100b may be improved.

The second photoelectric conversion element group 120b according to an example embodiment includes a plurality of photodiodes. Each of the plurality of photodiodes of the second photoelectric conversion element group 120b is connected to the fourth floating diffusion region FD4 through individual transfer gate STG. The plurality of transfer gates STG are controlled by the same control signal. Accordingly, the plurality of photodiodes of the second photoelectric conversion element group 120b transfer charges to the fourth floating diffusion region FD4 in response to the same control signal in the same period during a read-out mode of the pixel.

The second switching transistor SW2 connects the third floating diffusion region FD3 to the fourth floating diffusion region FD4. The second switching transistor SW2 is turned off in a read-out mode related to the first photoelectric conversion element group 110b. The second switching transistor SW2 is turned on during at least one period of the read-out mode related to the second photoelectric conversion element group 120b.

The fourth floating diffusion region FD4 is connected to the charge storage element CP. Charges overflowed from the plurality of photodiodes of the second photoelectric conversion element group 120b may be stored in the charge storage element CP. The charge storage element CP is coupled to the capacitance of the fourth floating diffusion region FD4.

In the pixel 100b according to an example embodiment, both the first photoelectric conversion element group 110b and the second photoelectric conversion element group 120b include a plurality of photodiodes. Accordingly, the sensitivity ratio between the first photoelectric conversion element group 110b and the second photoelectric conversion element group 120b may be adjusted to be suitable for the illumination environment. For example, the ratio of the number of photoelectric conversion elements respective the first photoelectric conversion element group 110b and the second photoelectric conversion element group 120b may be configured differently for the different illumination environment. The pixel 100b may be configured to have a larger number of photoelectric conversion elements of the first photoelectric conversion element group 110b for the low illumination environment than for the bright illumination environment. So, for the purpose of enhancing sensitivity of the low illumination environment, the number of photoelectric conversion elements of the first photoelectric conversion element group 110b may be configured more than the bright illumination environment.

Figure 4:
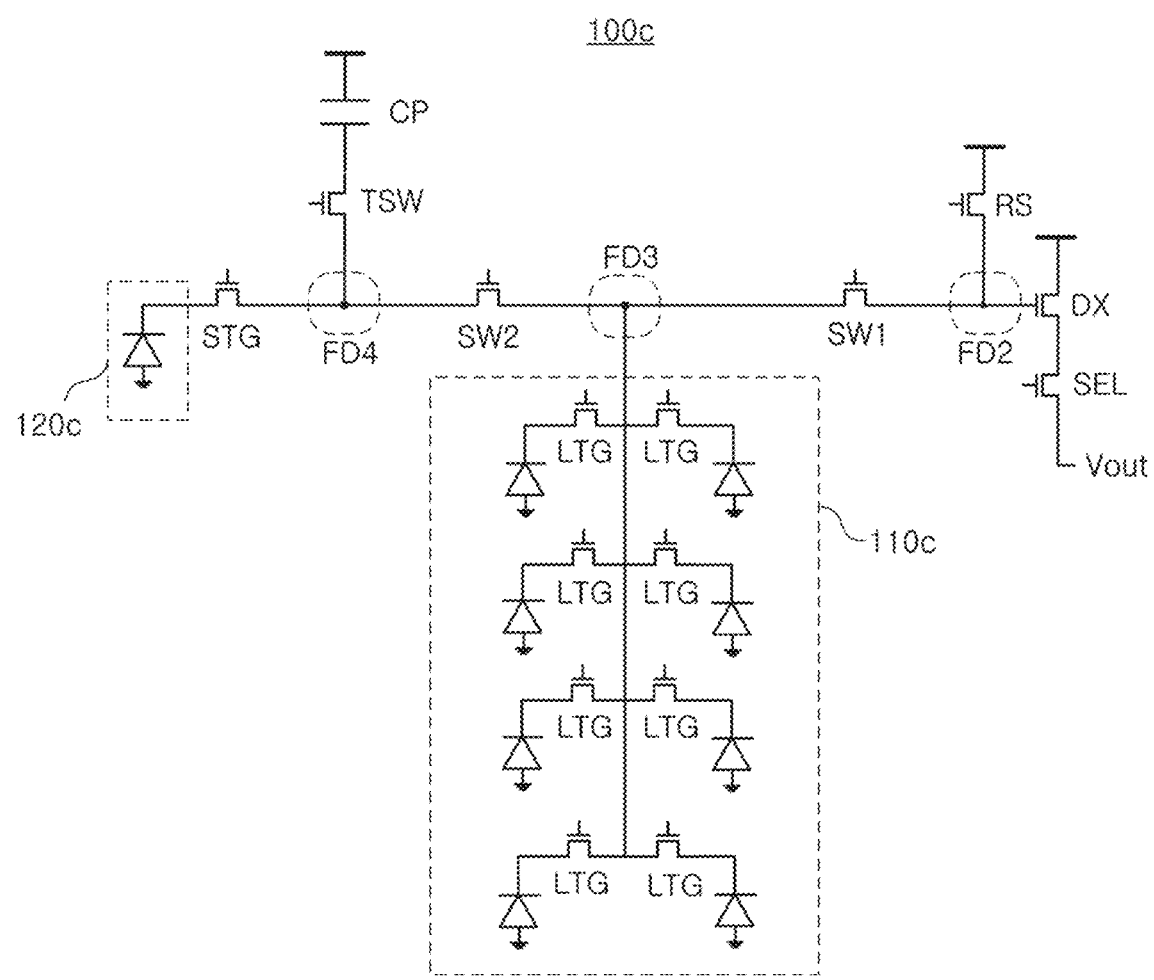
FIG. 4 is a circuit diagram of a pixel of an image sensor according to an example embodiment.

FIG. 4 is a circuit diagram of a pixel 100c of an image sensor according to an example embodiment.

With reference to FIG. 4, the pixel 100c of the image sensor according to an example embodiment will be described in detail. The pixel 100c of the image sensor according to an example embodiment includes a first photoelectric conversion element group 110c, a second photoelectric conversion element group 120c, the plurality of first floating diffusion regions FD3 and FD4, the second floating diffusion region FD2, the reset transistor RS, the driving transistor DX, the selection transistor SEL, a plurality of switching elements SW1, SW2, and TSW, and the charge storage element CP. Additional descriptions of overlapping or similar parts to those described above will be omitted to avoid redundancy.

In an example embodiment illustrated in FIG. 4, the pixel 100c is described as being composed of 9 sub-pixels, the first photoelectric conversion element group 110c is described as being composed of 8 sub-pixels, and the second photoelectric conversion element group 120c is described as being composed of one sub-pixel. However, it is not excluded that the second photoelectric conversion element group 120c includes a plurality of photodiodes.

The first floating diffusion region according to an example embodiment includes the third floating diffusion region FD3 and the fourth floating diffusion region FD4, which are the plurality of floating diffusion regions.

In the pixel 100c according to an example embodiment, the second floating diffusion region FD2 is not coupled to the third floating diffusion region FD3 in the HCG mode of the first photoelectric conversion element group 110c. In the LCG mode of the first photoelectric conversion element group 110c, the second floating diffusion region FD2 is coupled to the third floating diffusion region FD3.

Accordingly, the output of the first photoelectric conversion element group 110c may be output with a high conversion gain or a low conversion gain selectively applied based on the operation of the first switching transistor SW1. As a result, the dynamic range of the pixel 100c may be improved.

The photodiodes of the second photoelectric conversion element group 120c according to an example embodiment are respectively connected to the fourth floating diffusion region FD4 through individual transfer gate STG. The fourth floating diffusion region FD4 is connected to the charge storage element CP through the switching element TSW. The switching element TSW may be a switching transistor.

The switching element TSW connected to the charge storage element CP is selectively turned on or off depending on a mode of the second photoelectric conversion element group 120c to connect the fourth floating diffusion region FD4 to the charge storage element CP. The capacitance of the fourth floating diffusion region FD4 is coupled with the capacitance of the charge storage element CP depending on the turning on or off of the switching element TSW. The switching element TSW is turned off in the HCG mode of the second photoelectric conversion element group 120c and is turned on in the LCG mode of the second photoelectric conversion element group 120c.

The pixel 100c according to an example embodiment of FIG. 4 selectively may connect the charge storage element CP to the fourth floating diffusion region FD4, thereby applying different conversion gains to the output of the second photoelectric conversion element group 120c. Therefore, the dynamic range of a pixel may be improved.

Figure 5:
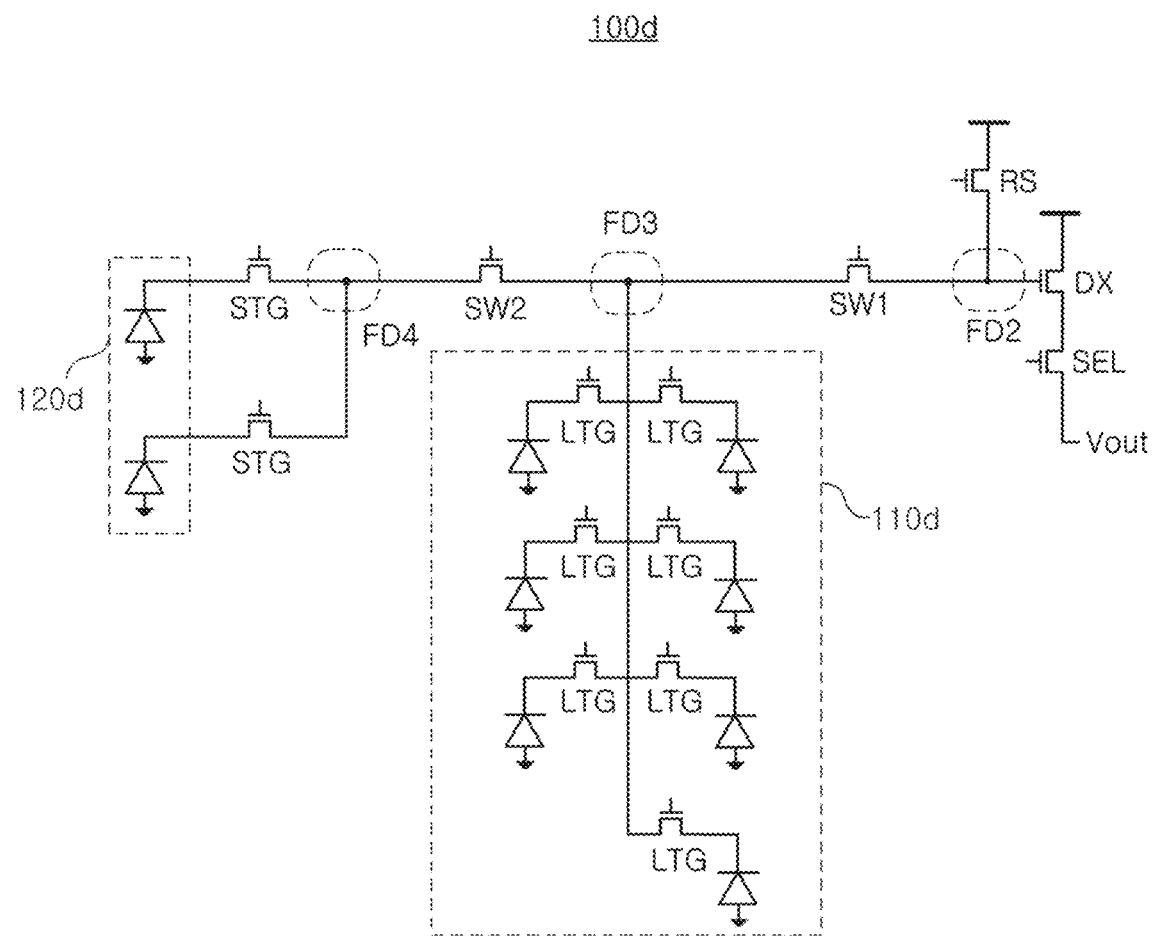
FIG. 5 is a circuit diagram of a pixel of an image sensor according to an example embodiment.

FIG. 5 is a circuit diagram of a pixel 100d of an image sensor according to an example embodiment.

With reference to FIG. 5, the pixel 100d of the image sensor according to an example embodiment will be described in detail. The pixel 100d of the image sensor according to an example embodiment includes a first photoelectric conversion element group 110d, a second photoelectric conversion element group 120d, the plurality of first floating diffusion regions FD3 and FD4, the second floating diffusion region FD2, the reset transistor RS, the driving transistor DX, the selection transistor SEL, and the plurality of switching elements SW1 and SW2. Additional descriptions of overlapping or similar parts to those described above will be omitted to avoid redundancy.

In an example embodiment illustrated in FIG. 5, the pixel 100d is described as being composed of 9 sub-pixels, the first photoelectric conversion element group 110d is described as being composed of 7 sub-pixels, and the second photoelectric conversion element group 120d is described as being composed of 2 sub-pixels. In detail, the second photoelectric conversion element group 120d includes a plurality of photodiodes. The two sub-pixels of the second photoelectric conversion element group 120d is an example, and the second photoelectric conversion element group 120d includes a plurality of photodiodes that are smaller in number than the photodiodes of the first photoelectric conversion element group 110d.

In the pixel 100d according to an example embodiment, the second floating diffusion region FD2 is not coupled to the third floating diffusion region FD3 in the HCG mode of the first photoelectric conversion element group 110d. In the LCG mode of the first photoelectric conversion element group 110d, the second floating diffusion region FD2 is coupled to the third floating diffusion region FD3.

Accordingly, the output of the first photoelectric conversion element group 110d may be output with a high conversion gain or a low conversion gain selectively applied based on the operation of the first switching transistor SW1. As a result, the dynamic range of the pixel 100d may be improved.

The photodiodes of the second photoelectric conversion element group 120d according to an example embodiment are respectively connected to the fourth floating diffusion region FD4 through individual transfer gate STG. The plurality of transfer gates STG are controlled by the same control signal. Accordingly, the plurality of photodiodes of the second photoelectric conversion element group 120d transfer charges to the fourth floating diffusion region FD4 in response to the same control signal in the same period during a read-out mode of the pixel.

The second switching transistor SW2 connects the third floating diffusion region FD3 to the fourth floating diffusion region FD4. The second switching transistor SW2 is turned off in a read-out mode related to the first photoelectric conversion element group 110d.

The second switching transistor SW2 is turned on during at least one period of the read-out mode related to the second photoelectric conversion element group 120d.

Figure 6:
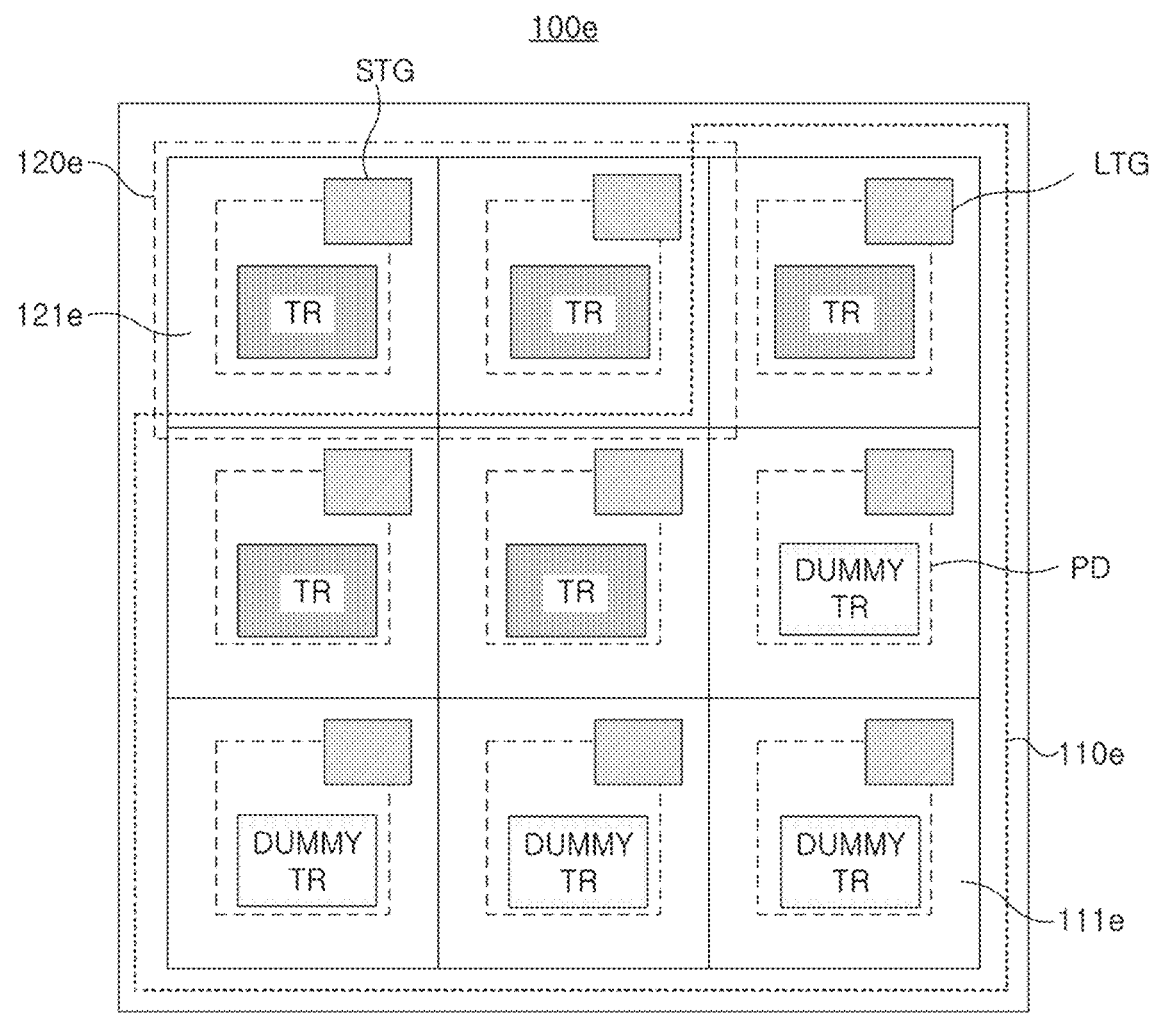
FIG. 6 is a plan view of a pixel of an image sensor according to an example embodiment.

FIG. 6 is a diagram illustrating a layout of a pixel 100e of an image sensor according to an example embodiment.

With reference to FIG. 6, the pixel 100e of the image sensor according to an example embodiment will be described in detail. The pixel 100e of the image sensor according to an example embodiment includes a plurality of sub-pixels 11le and 12le. Each of the sub-pixels 11le and 12le includes a photoelectric conversion element PD, a first transistor (i.e., a transfer gate STG or a transfer gate LTG), and a second transistor (i.e., a transistor TR or a dummy transistor DUMMY TR _. Each of the sub-pixels 11le and 12le is included in any one of a first photoelectric conversion element group 110e and a second photoelectric conversion element group 120e. Additional descriptions of overlapping or similar parts to those described above will be omitted to avoid redundancy.

A layout of the pixel 100e of FIG. 6 may be the layout of the pixel 100b described with reference to FIG. 3 or the pixel 100d described with reference to FIG. 5. In an example embodiment illustrated in FIG. 6, the pixel 100e is described as being composed of 9 sub-pixels 11le and 12le, the first photoelectric conversion element group 110e is described as being composed of 7 sub-pixels 11le, and the second photoelectric conversion element group 120e is described as being composed of 2 sub-pixels 121e. However, it is not excluded that the second photoelectric conversion element group 120e is composed of one sub-pixel or a plurality of sub-pixels smaller than the number of sub-pixels of the first photoelectric conversion element group 110e.

The transistor TR in some of the plurality of sub-pixels may be any one of the reset transistor RS, the driving transistor DX, and the selection transistor SEL.

The transistor TR in some of the plurality of sub-pixels may be any one of the plurality of switching elements SW1 and SW2 or the switching element TSW connected to the charge storage element CP of the pixel 100c described with reference to FIG. 4. In this case, the number of the plurality of transistors TR in FIG. 6 may be greater than that illustrated in FIG. 6.

The pixel 100e includes a charge storage element within the pixel. The charge storage element may be an in-pixel capacitor located inside the substrate.

The sub-pixels 11le of the first photoelectric conversion element group 110e of the pixel 100e include the transfer transistor LTG, and the sub-pixels 12le of the second photoelectric conversion element group 120e include the transfer transistor STG.

The pixel 100e of the image sensor according to an example embodiment includes the plurality of first floating diffusion regions FD3 and FD4 and the second floating diffusion region FD2. Additional descriptions of overlapping or similar parts to those described above will be omitted to avoid redundancy.

The first floating diffusion region according to an example embodiment includes the third floating diffusion region FD3 and the fourth floating diffusion region FD4, which are the plurality of floating diffusion regions. The third floating diffusion region FD3 is connected to the sub-pixels 11le of the first photoelectric conversion element group 110e through the transfer gate LTG. The fourth floating diffusion region FD4 is connected to the sub-pixels 121e of the second photoelectric conversion element group 120e through the transfer gate STG.

The light receiving areas of each photoelectric conversion element PD included in the first photoelectric conversion element group 110e and the second photoelectric conversion element group 120e of the pixel 100e according to an example embodiment may be the same to each other. Each of the sub-pixels 11le and 12le included in the first photoelectric conversion element group 110e and the second photoelectric conversion element group 120e may have the same area. Therefore, by constructing the pixel 100e based on the plurality of photoelectric conversion elements PD or the sub-pixels 11le and 12le having the same light receiving area, the size of the pixel 100e may be reduced while improving the dynamic range of the pixel 100e.

Among the plurality of sub-pixels 11le and 12le included in the first photoelectric conversion element group 110e and the second photoelectric conversion element group 120e of the pixel 100e according to an example embodiment, a transistor of at least one sub-pixel is composed of the dummy transistor DUMMY TR. In the pixel 100e according to an example embodiment of FIG. 6, five of the plurality of transistors TR and DUMMY TR are respectively composed of the reset transistor RS, the driving transistor DX, the selection transistor SEL, and the plurality of switching elements SW1 and SW2, and the rest are composed of the dummy transistors DUMMY TR. FIG. 6 illustrates that the dummy transistors DUMMY TR are included only in the sub-pixels 11le of the first photoelectric conversion element group 110e, but according to an implementation example, the dummy transistors DUMMY TR may be included in any one of the sub-pixels 11le of the first photoelectric conversion element group 110e and the sub-pixels 121e of the second photoelectric conversion element group 120e.

Accordingly, because each of the sub-pixels 11le and 121e equally includes the photoelectric conversion element PD, the transfer transistors LTG and STG, and the transistors TR and DUMMY TR, each of the sub-pixels 11le and 121e included in the first photoelectric conversion element group 110e and the second photoelectric conversion element group 120e may be formed through the same process. Accordingly, each of the sub-pixels 11le and 121e may be formed in a unified process while having a symmetrical structure. Ease of process of the pixel 100e is improved, and because each of the sub-pixels 11le and 12le share the transistor TR, the area of the pixel may be reduced.

Each of the sub-pixels 11le and 12le may be separated from each other by a separation layer. The separation layer may be formed inside a deep trench isolation (DTI) structure. The separation layer may be formed inside the DTI trench (TCH) structure penetrating all or most between the front surface FS and the back surface of the substrate 130. The DTI trench TCH may be formed surrounding each sub-pixel or may be formed surrounding at least part of each sub-pixel. The separation layer may include a conductive layer filling the inside of the trench TCH and an insulating layer. The DTI structure may be formed of a Frontside-DTI (FDTI). The DTI structure may be a full depth DTI structure.

Figure 7:
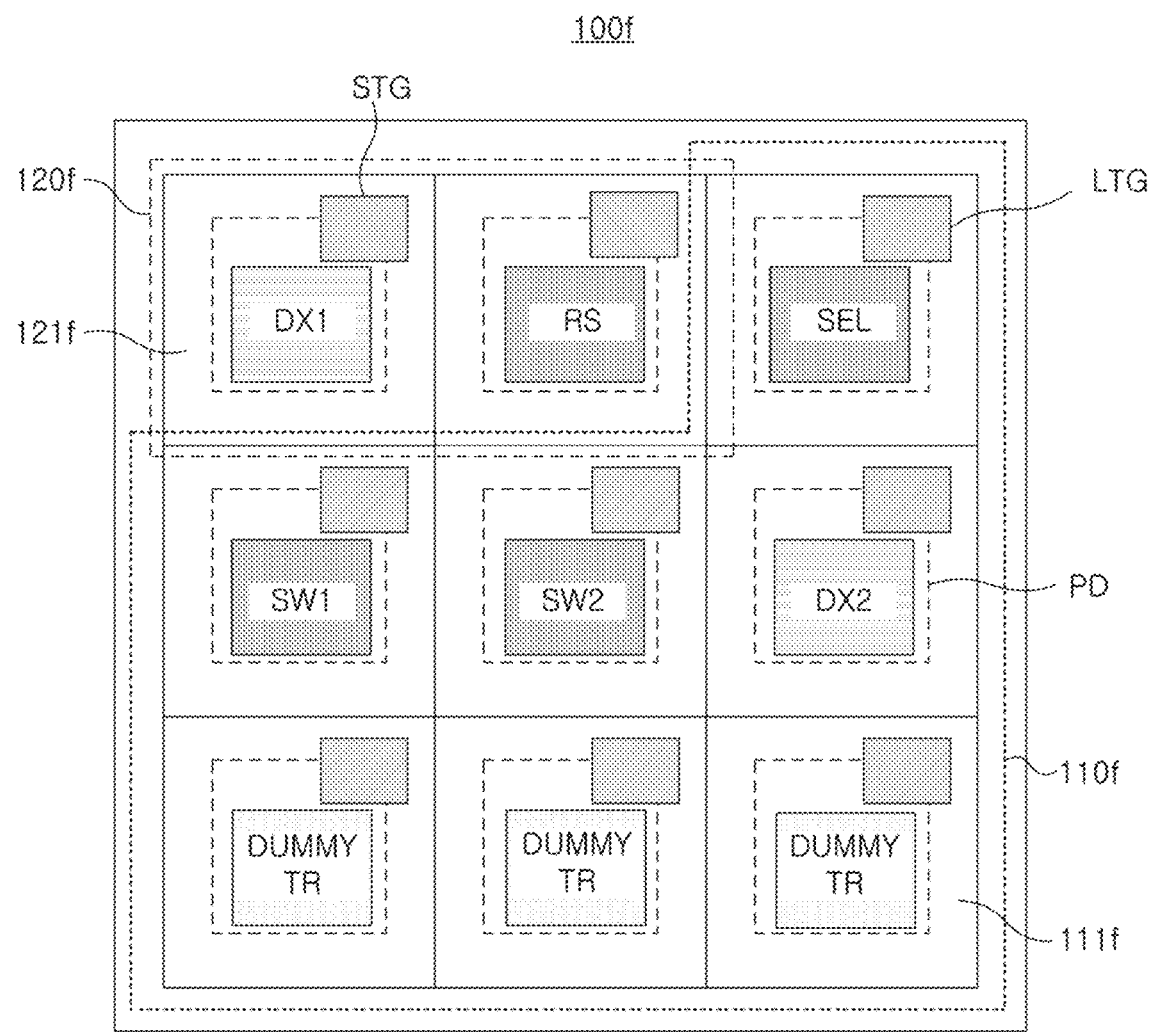
FIG. 7 is a plan view of a pixel of an image sensor according to an example embodiment.

FIG. 7 is a diagram illustrating a layout of a pixel 100f of an image sensor according to an example embodiment.

With reference to FIG. 7, the pixel 100f of the image sensor according to an example embodiment will be described in detail. The pixel 100f of the image sensor according to an example embodiment includes a plurality of sub-pixels 111f and 121f. Each of the sub-pixels 111f and 121f includes the photoelectric conversion element PD, a first transistor (i.e., a transfer gate STG or a transfer gate LTG), and a second transistor (i.e., a transistor TR or a dummy transistor DUMMY TR). Each of the sub-pixels 111f and 121f is included in any one of a first photoelectric conversion element group 110f and a second photoelectric conversion element group 120f. Additional descriptions of overlapping or similar parts to those described above will be omitted to avoid redundancy.

The transistor TR in some of the plurality of sub-pixels may be any one of the reset transistor RS, driving transistors DX1 and DX2, and the selection transistor SEL.

The transistor TR in some of the plurality of sub-pixels may be any one of the plurality of switching elements SW1 and SW2, any one of the driving transistors DX1 and DX2, or the switching element TSW connected to the charge storage element CP of the pixel 100c described with reference to FIG. 4.

The pixel 100f includes a charge storage element within the pixel. The charge storage element may be an in-pixel capacitor located inside the substrate.

Unlike the pixel 100e of FIG. 6, the pixel 100f of FIG. 7 includes the plurality of driving transistors DX1 and DX2. Accordingly, the number of sub-pixels including the dummy transistors DUMMY TR in the pixel 100f of FIG. 7 is less than the number of sub-pixels including the dummy transistors DUMMY TR in the pixel 100e of FIG. 6. The plurality of driving transistors DX1 and DX2 may be connected in parallel with each other.

The pixel 100f of the image sensor according to an example embodiment includes the plurality of driving transistors DX1 and DX2 connected in parallel to each other, thereby improving the ease of process of the pixel 100f and reducing noise of the pixel 100f.

Figure 8:
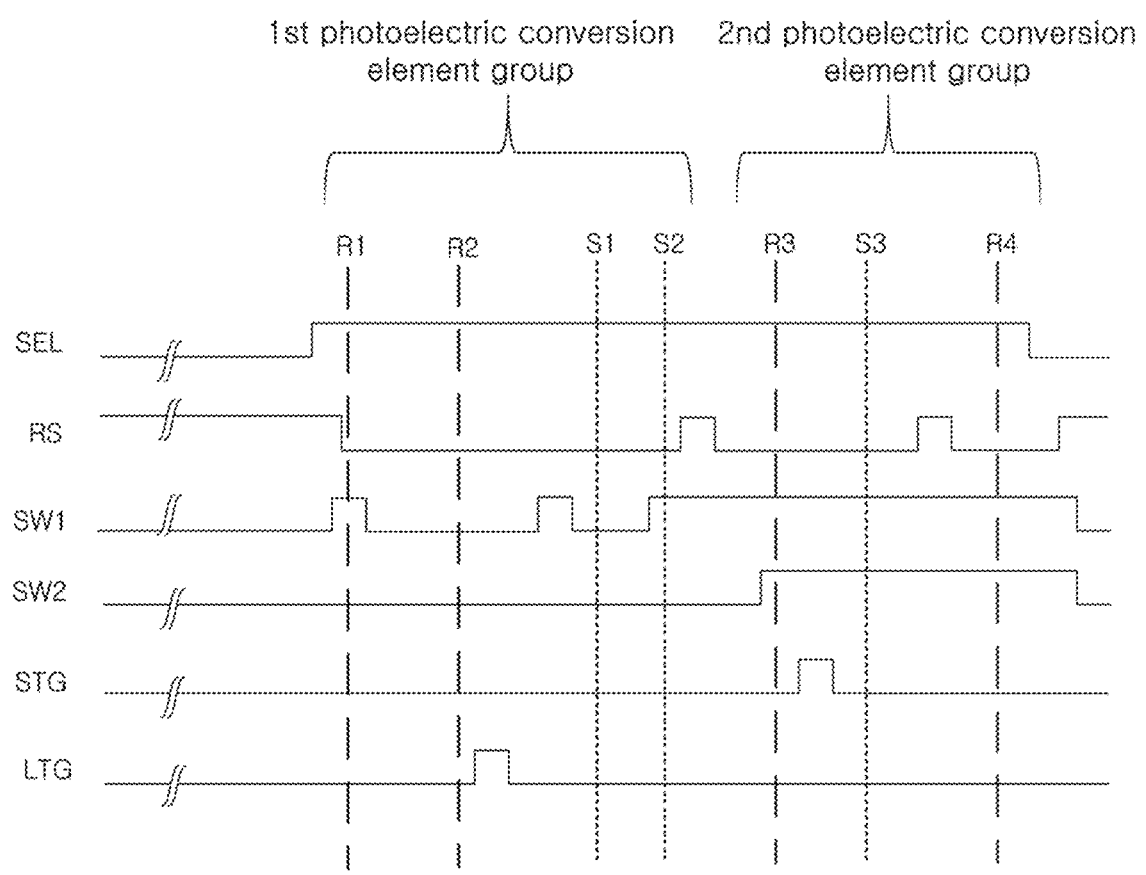
FIG. 8 is a timing diagram of an image sensor according to an example embodiment.

FIG. 8 is a timing diagram including an example of a read-out mode of the first photoelectric conversion element groups 110, 110a, 110b, 110c, 110d, and 110e of the pixels 100, 100a, 100b, 100c, 100d, and 100e described with reference to FIGS. 1 to 6. FIGS. 9A to 9E are diagrams illustrating potential diagrams in a read-out mode of the first photoelectric conversion element groups 110, 110a, 110b, 110c, 110d, and 110e according to the timing diagram of FIG. 8. Additional descriptions of overlapping or similar parts to those described above will be omitted to avoid redundancy.

After the photoelectric conversion elements PD of the first photoelectric conversion element groups 110, 110a, 110b, 110c, 110d, and 110e are exposed to incident light, the read-out mode of the photoelectric conversion elements PD of the first photoelectric conversion element groups 110, 110a, 110b, 110c, 110d, and 110e is performed while the selection transistor SEL is turned on.

In a state in which the reset transistor RS is turned on, the second floating diffusion region FD2 is reset, the first switching transistor SW1 is turned on, and the third floating diffusion region FD3 connected to the second floating diffusion region FD2 through the first switching transistor SW1 is reset. After the second floating diffusion region FD2 and the third floating diffusion region FD3 are reset, the reset transistor RS is turned off.

Figure 9A:
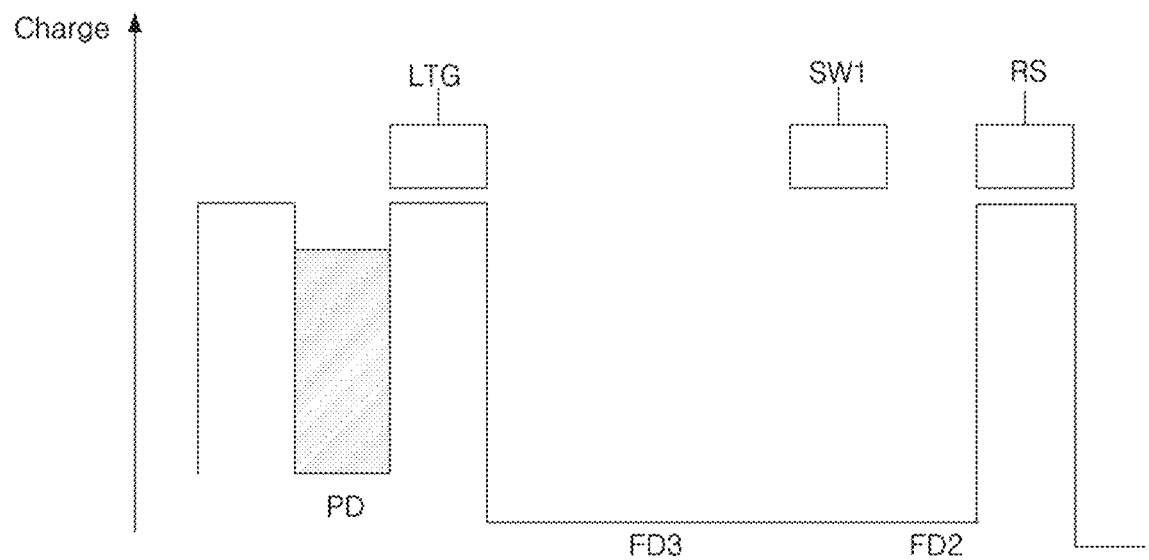
FIGS. 9A, 9B, 9C, 9D and 9E are potential diagrams of an image sensor according to an example embodiment.

Referring to FIGS. 8 and 9A, after the reset transistor RS is turned off, the first switching transistor SW1 is turned on. When the first switching transistor SW1 is turned on, a reset signal R1 of the second floating diffusion region FD2 coupled to the third floating diffusion region FD3 is sampled. After sampling the reset signal R1, the first switching transistor SW1 is turned off.

Figure 9B:
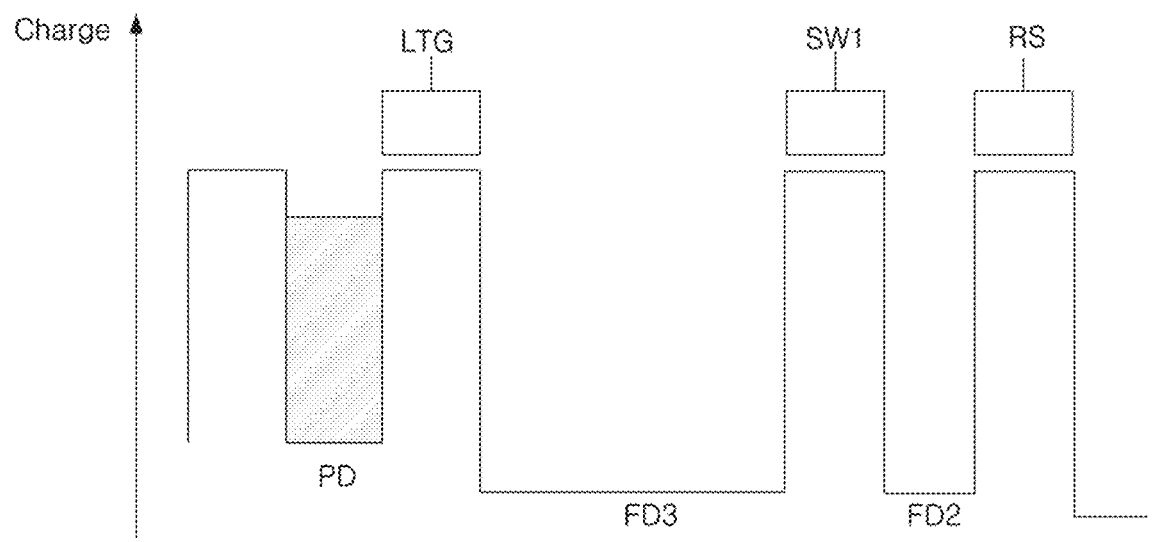

Referring to FIGS. 8 and 9B, in a state in which the first switching transistor SW1 is turned off, a reset signal R2 of the second floating diffusion region FD2 not coupled to the third floating diffusion region FD3 is sampled.

Figure 9C:
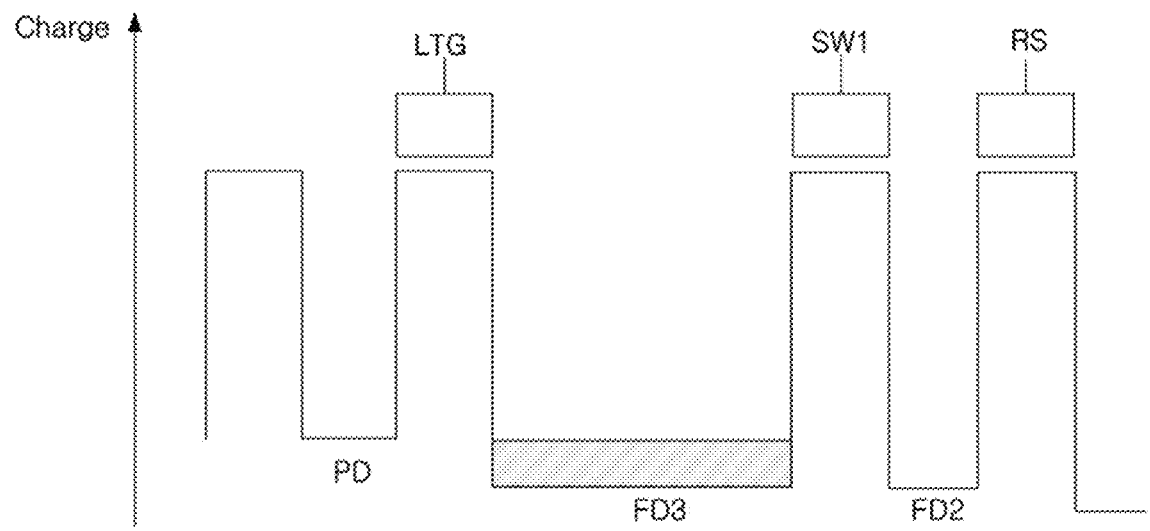

Referring to FIGS. 8 and 9C, the transfer transistors LTG individually connected to the plurality of photoelectric conversion elements PD of the first photoelectric conversion element groups 110, 110a, 110b, 110c, 110d, and 110e are controlled by the same control signal. Charges accumulated in each photoelectric conversion element PD of the first photoelectric conversion element groups 110, 110a, 110b, 110c, 110d, and 110e are transferred to the third floating diffusion region FD3.

Figure 9D:
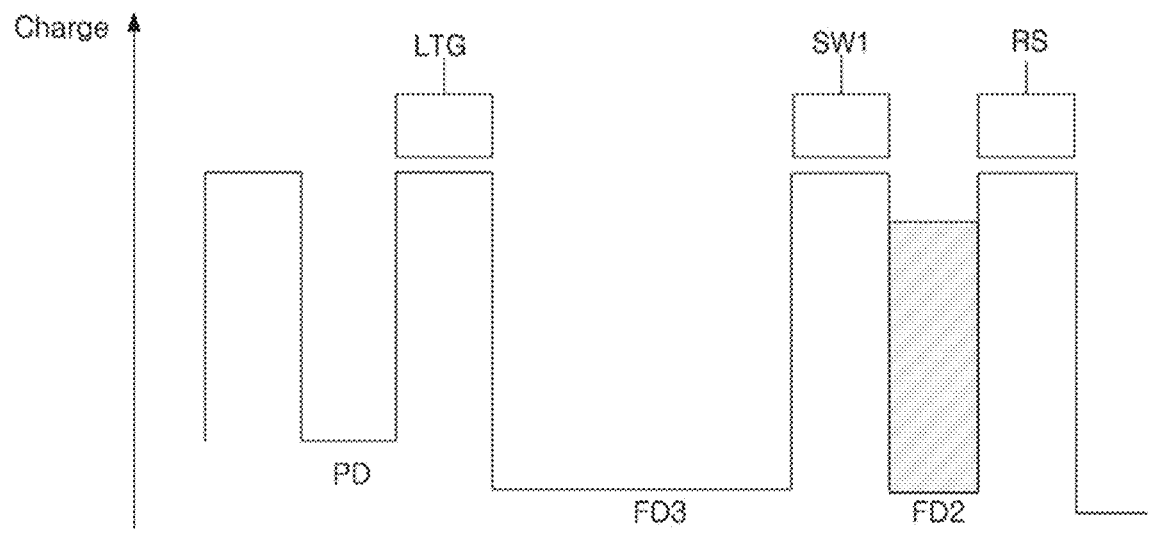

Referring to FIGS. 8 and 9D, when the first switching transistor SW1 is turned on, charges of the third floating diffusion region FD3 move to the second floating diffusion region FD2. The first switching transistor SW1 is turned off again, and the second floating diffusion region FD2 is separated from the third floating diffusion region FD3. The voltage of the second floating diffusion region FD2 from which the third floating diffusion region FD3 is separated is sampled (S1), and is output as the image signal Vout of the HCG mode of the first photoelectric conversion element groups 110, 110a, 110b, 110c, 110d, and 110e.

Figure 9E:
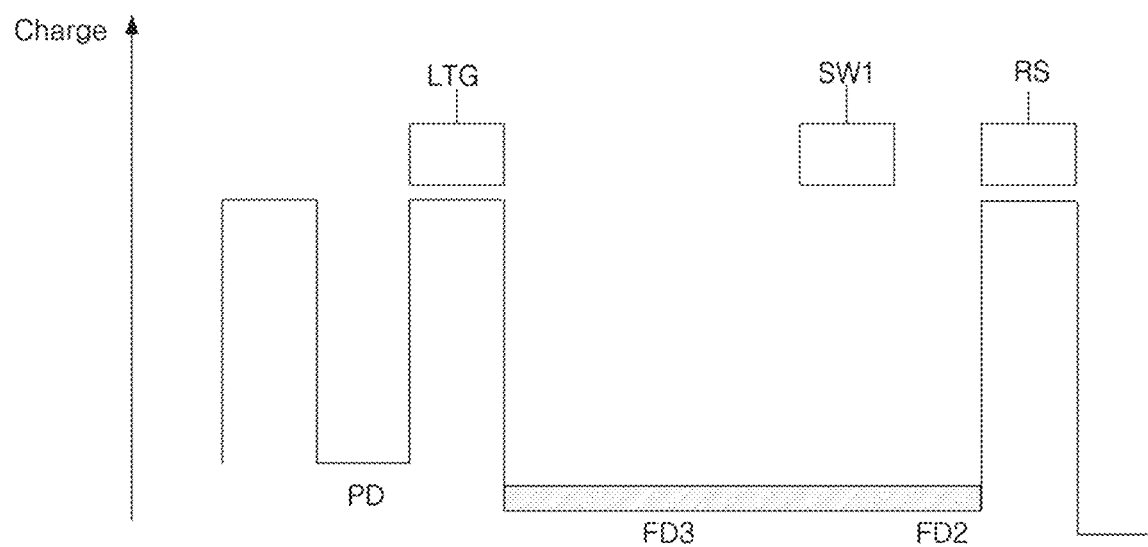

Referring to FIGS. 8 and 9E, the first switching transistor SW1 is turned on again, and the second floating diffusion region FD2 is coupled to the third floating diffusion region FD3. The voltage of the second floating diffusion region FD2 to which the third floating diffusion region FD3 is coupled is sampled (S2), and is output as the image signal Vout of the LCG mode of the first photoelectric conversion element groups 110, 110a, 110b, 110c, 110d, and 110e.

FIG. 8 is a timing diagram including an example of the read-out mode of the second photoelectric conversion element groups 120, 120a, 120b, 120d, and 120e of the pixels 100, 100a, 100b, 100d, and 100e described with reference to FIGS. 1 to 3 and 5. FIGS. 10A to 10D are diagrams illustrating potential diagrams in the read-out mode of the second photoelectric conversion element groups 120, 120a, 120b, 120d, and 120e according to the timing diagram of FIG. 8. Additional descriptions of overlapping or similar parts to those described above will be omitted to avoid redundancy.

When the first switching transistor SW1 is turned on, the read-out mode of the second photoelectric conversion element groups 120, 120a, 120b, 120d, and 120e is performed.

Figure 10A:
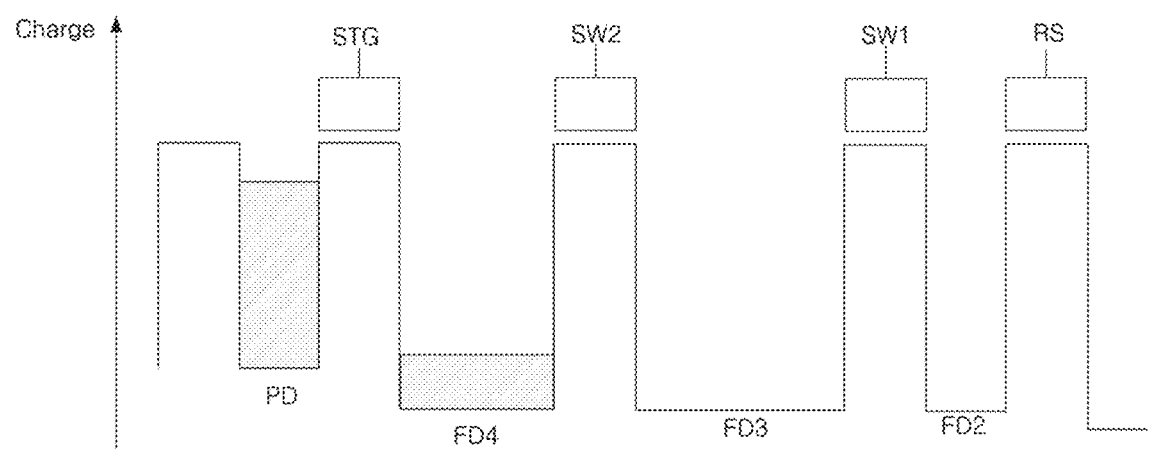
FIGS. 10A, 10B, 10C and 10D are potential diagrams of an image sensor according to an example embodiment.

When the first switching transistor SW1 is turned on, the second floating diffusion region FD2 and the third floating diffusion region FD3 are reset depending on the operation of the reset transistor RS. FIG. 10A illustrates that some charges of the second photoelectric conversion element groups 120, 120a, 120b, 120d, and 120e are overflowed in the charge storage element CP coupled to the fourth floating diffusion region FD4 when the second floating diffusion region FD2 and the third floating diffusion region FD3 are reset.

Figure 10B:
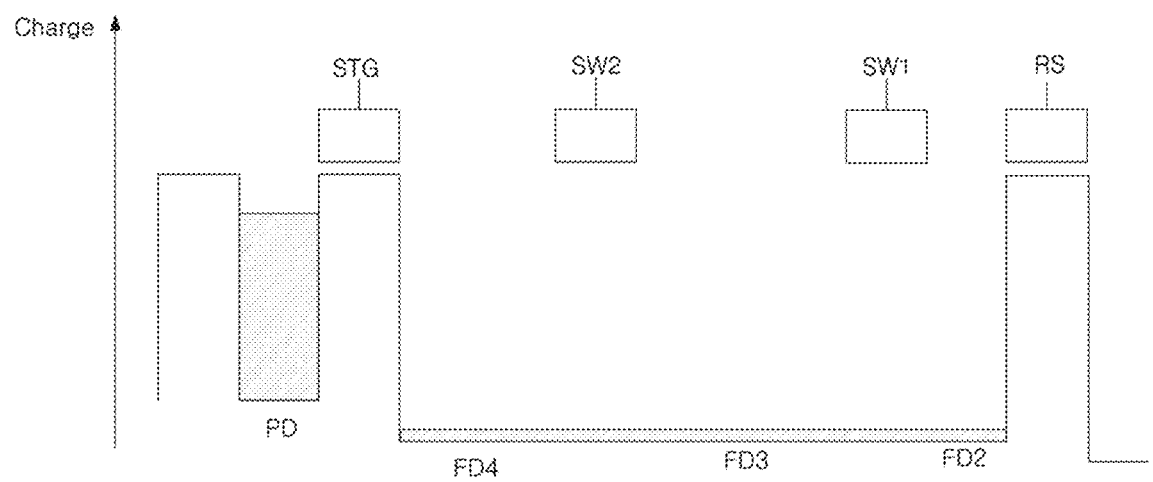

Referring to FIGS. 8 and 10B, when the second switching transistor SW2 disposed between the third floating diffusion region FD3 and the fourth floating diffusion region FD4 is turned on, the second floating diffusion region FD2 is coupled to the third floating diffusion region FD3 and the fourth floating diffusion region FD4. When the second switching transistor SW2 is turned on, a reset signal R3 of the second floating diffusion region FD2 coupled to the fourth floating diffusion region FD4 and the third floating diffusion region FD3 is sampled.

Figure 10C:
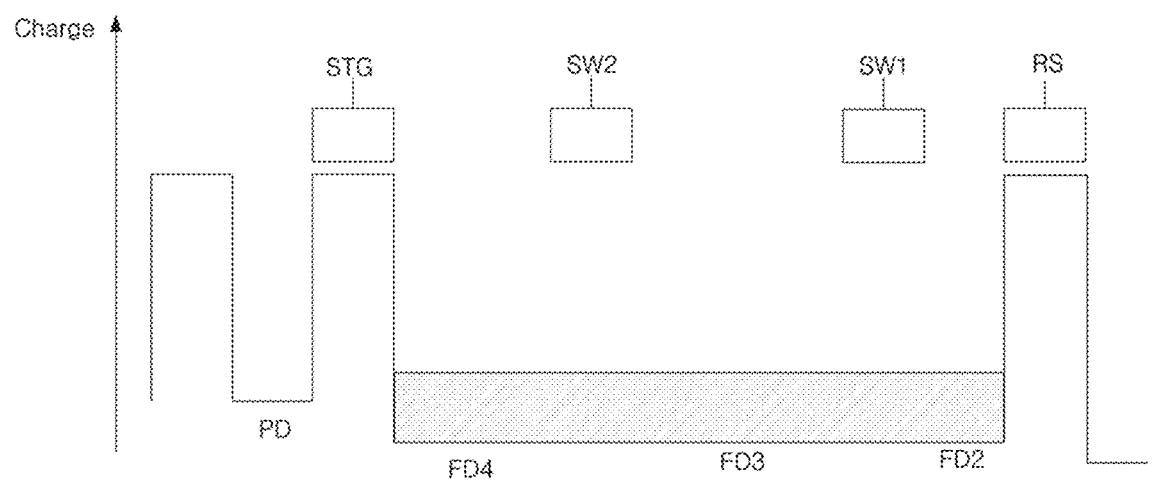

Referring to FIGS. 8 and 10C, the transfer transistor STG connected to at least one photoelectric conversion element PD of the second photoelectric conversion element groups 120, 120a, 120b, 120d, and 120e is controlled by the same control signal. Charges accumulated in each photoelectric conversion element PD of the second photoelectric conversion element groups 120, 120a, 120b, 120d, and 120e are transferred to the to the second floating diffusion region FD2 to which the fourth floating diffusion region FD4 and the third floating diffusion region FD3 are coupled, depending on turning on the transfer transistor STG. The voltage of the second floating diffusion region FD2 coupled to the fourth floating diffusion region FD4 and the third floating diffusion region FD3 is sampled (S3), and is output as the image signal Vout of the second photoelectric conversion element groups 120, 120a, 120b, 120d, 120e.

Figure 10D:
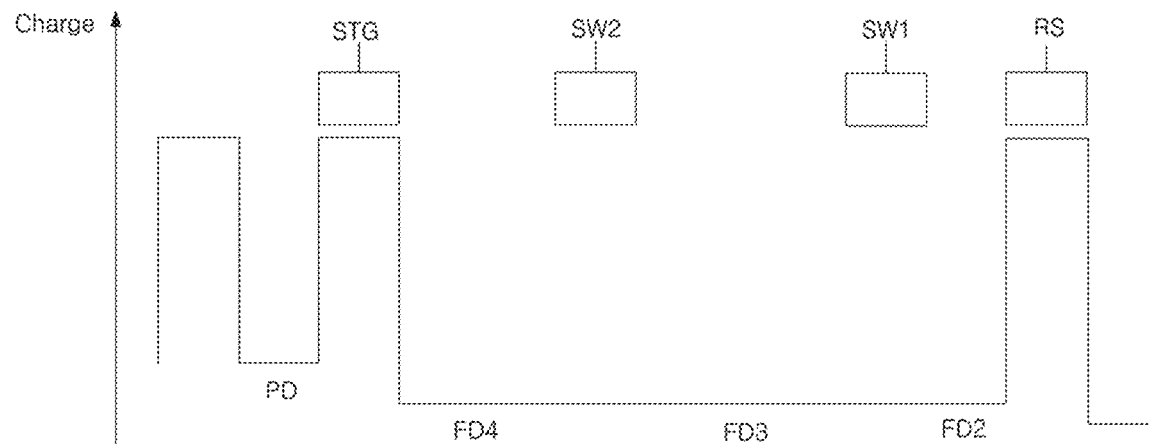

Referring to FIGS. 8 and 10D, in a state in which both the first switching transistor SW1 and the second switching transistor SW2 are turned on, the second floating diffusion region FD2 coupled to the fourth floating diffusion region FD4 and the third floating diffusion region FD3 is reset by the reset transistor RS. In a state in which both the first switching transistor SW1 and the second switching transistor SW2 are turned on, a reset signal R4 of the second floating diffusion region FD2 coupled to the fourth floating diffusion region FD4 and the third floating diffusion region FD3 is sampled.

Figure 11:
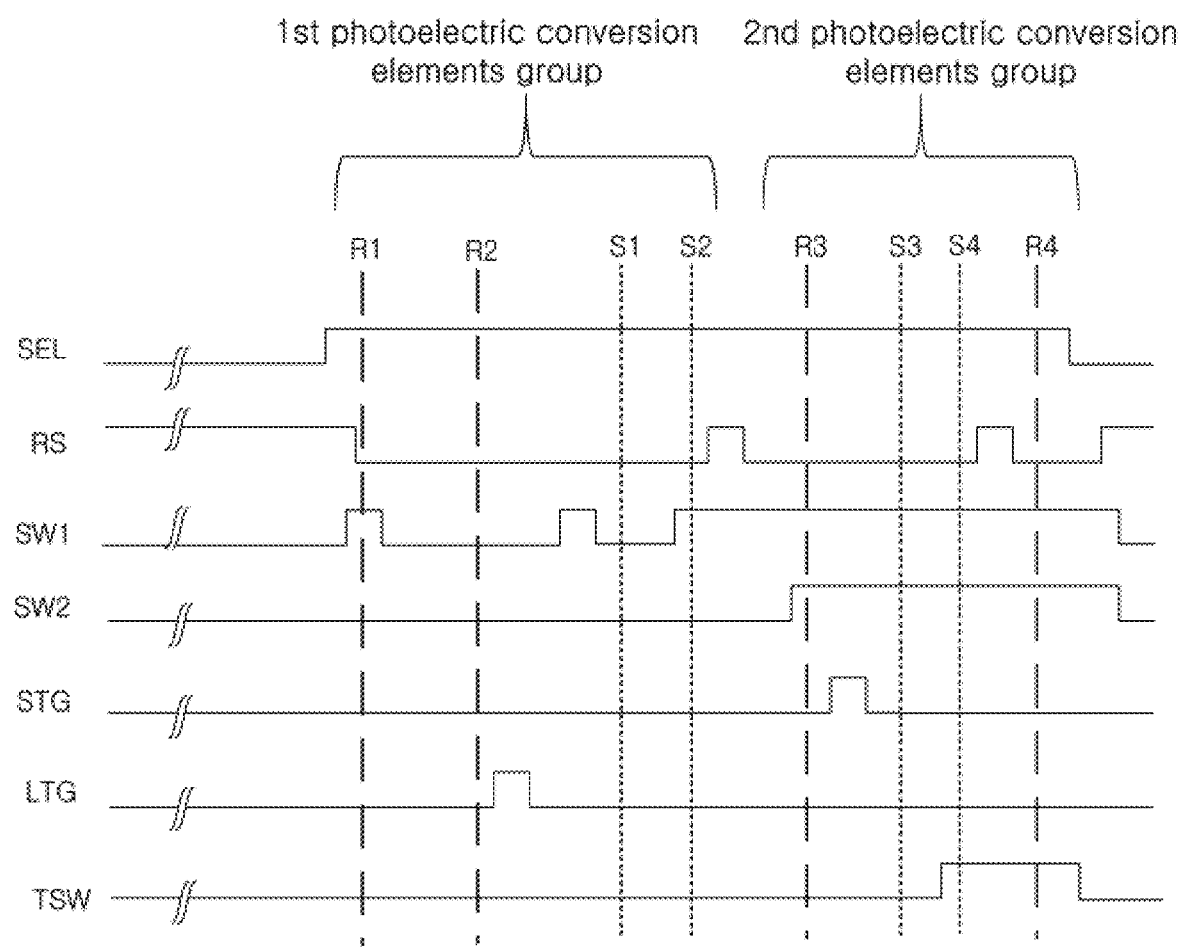
FIG. 11 is a timing diagram of an image sensor according to an example embodiment.

FIG. 11 is a timing diagram including an example of a read-out mode of the first photoelectric conversion element group 110c and the second photoelectric conversion element group 120c of the pixel 100c described with reference to FIG. 4. FIGS. 12A to 12E are diagrams illustrating potential diagrams of the read-out mode of the second photoelectric conversion element group 120c according to the timing diagram of FIG. 11. The operation of the first photoelectric conversion element group 110c is similar to that described with reference to FIGS. 8 and 9A to 9E. Additional descriptions of overlapping or similar parts to those described above will be omitted to avoid redundancy.

Figure 12A:
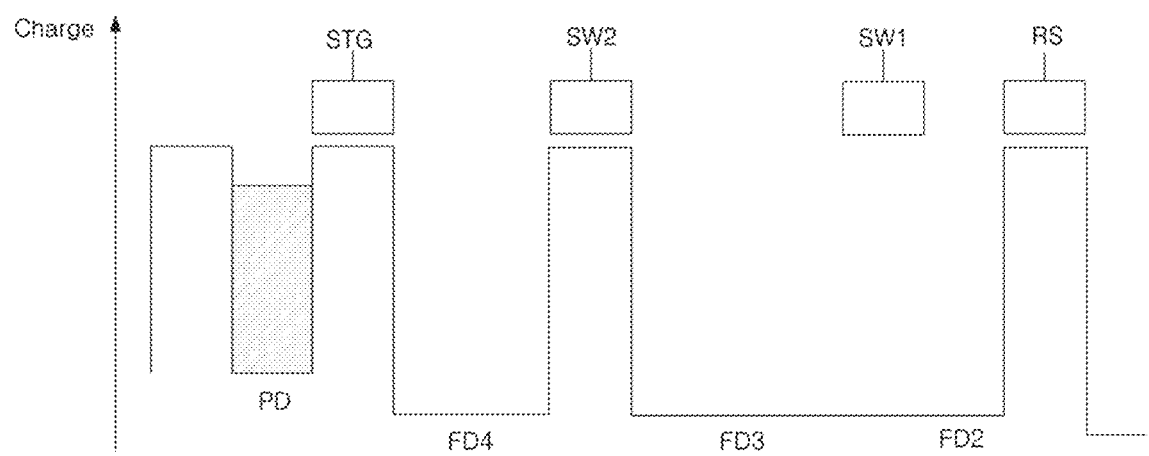
FIGS. 12A, 12B, 12C, 12D and 12E are potential diagrams of an image sensor according to an example embodiment.

After the read-out mode of the first photoelectric conversion element group 110c, in a state in which the first switching transistor SW1 is turned on, the second floating diffusion region FD2 and the third floating diffusion region FD3 are reset by the operation of the reset transistor RS. FIG. 12A illustrates that the second floating diffusion region FD2 and the third floating diffusion region FD3 are reset.

Figure 12B:
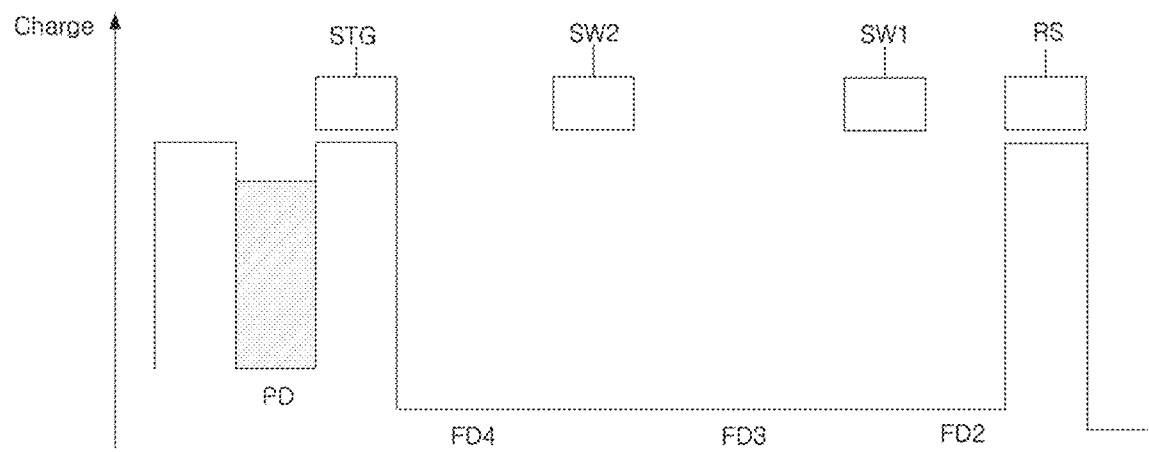

Referring to FIGS. 11 and 12B, when the second switching transistor SW2 disposed between the third floating diffusion region FD3 and the fourth floating diffusion region FD4 is turned on, the second floating diffusion region FD2 is coupled to the third floating diffusion region FD3 and the fourth floating diffusion region FD4. When the second switching transistor SW2 is turned on, the reset signal R3 of the second floating diffusion region FD2 coupled to the fourth floating diffusion region FD4 and the third floating diffusion region FD3 is sampled.

Figure 12C:
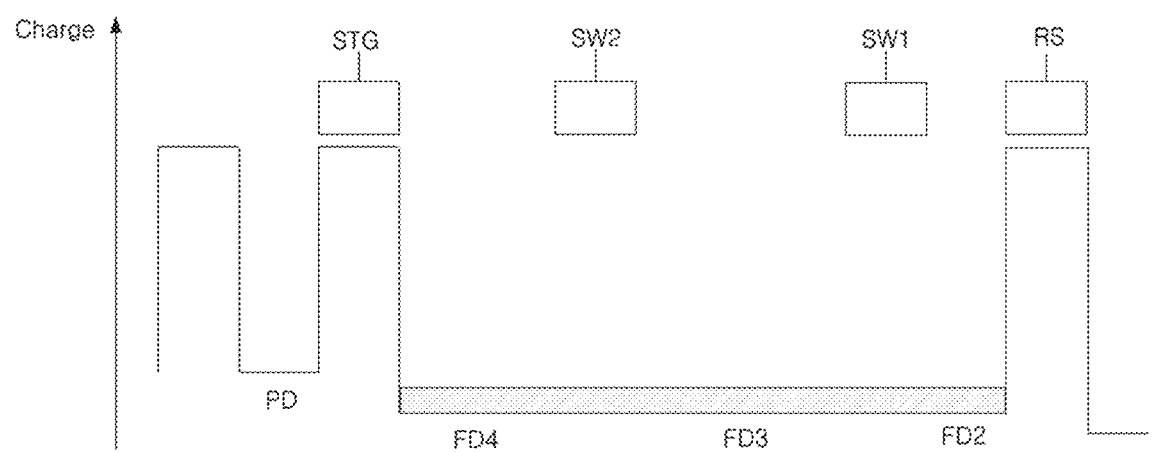

Referring to FIGS. 11 and 12C, charges accumulated in each photoelectric conversion element PD of the second photoelectric conversion element group 120c are transferred to the second floating diffusion region FD2 coupled to the fourth floating diffusion region FD4 and the third floating diffusion region FD3, depending on turning on the transfer transistor STG. The voltage of the second floating diffusion region FD2 coupled to the fourth floating diffusion region FD4 and the third floating diffusion region FD3 is sampled (S3), and is output as the image signal Vout of the HCG mode of the second photoelectric conversion element group 120c.

Figure 12D:
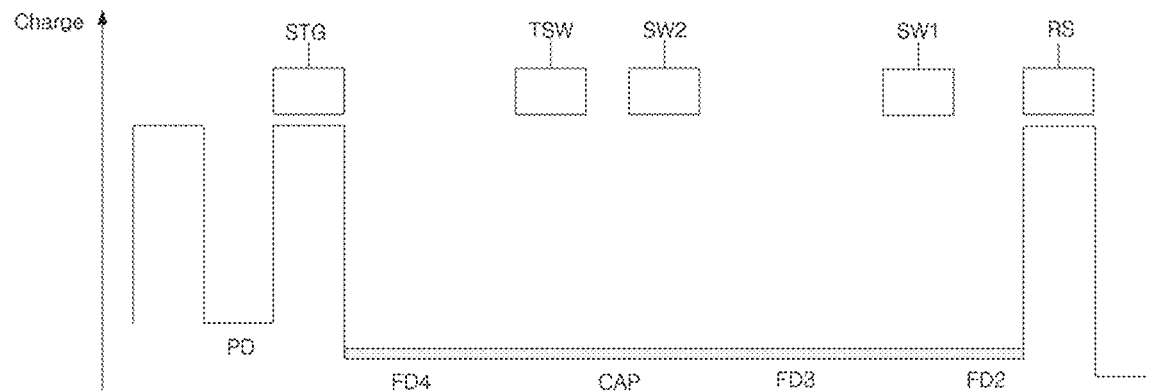

Referring to FIGS. 11 and 12D, in a state in which both the first switching transistor SW1 and the second switching transistor SW2 are turned on, the switching transistor TSW connected to the charge storage element CP is turned on. The voltage of the second floating diffusion region FD2, in which the capacitance of the charge storage element CP is coupled along with the fourth floating diffusion region FD4 and the third floating diffusion region FD3 is sampled (S4), and is output as the image signal Vout of the LCG mode of the second photoelectric conversion element group 120c.

Figure 12E:
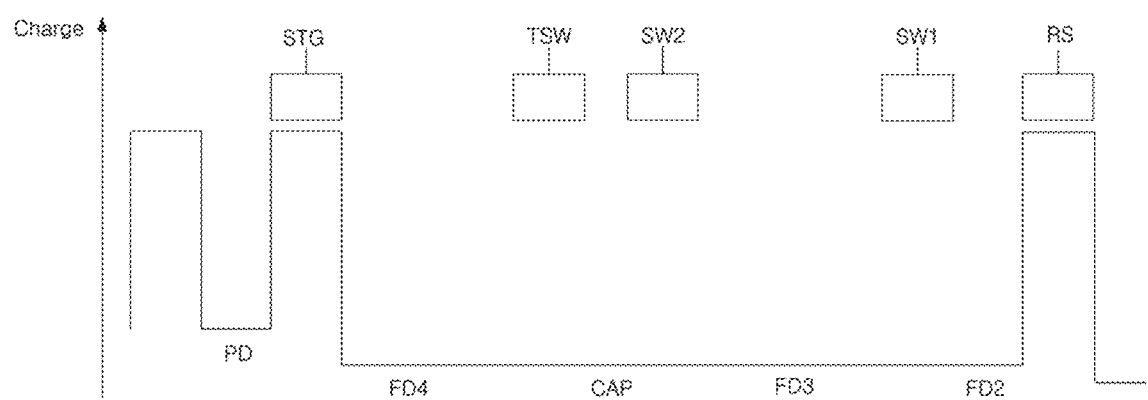

Referring to FIGS. 11 and 12E, in a state in which the capacitance of the charge storage element CP is coupled to the second floating diffusion region FD2 along with the third and fourth floating diffusion regions FD3 and FD4, the second floating diffusion region FD2 coupled with the capacitance of the charge storage element CP along with the third and fourth floating diffusion regions FD3 and FD4 is reset, depending on an operation of the reset transistor RS. The reset signal R4 of the second floating diffusion region FD2 in which the capacitance of the charge storage element CP is coupled along with the fourth floating diffusion region FD4 and the third floating diffusion region FD3 is sampled.

Figure 13:
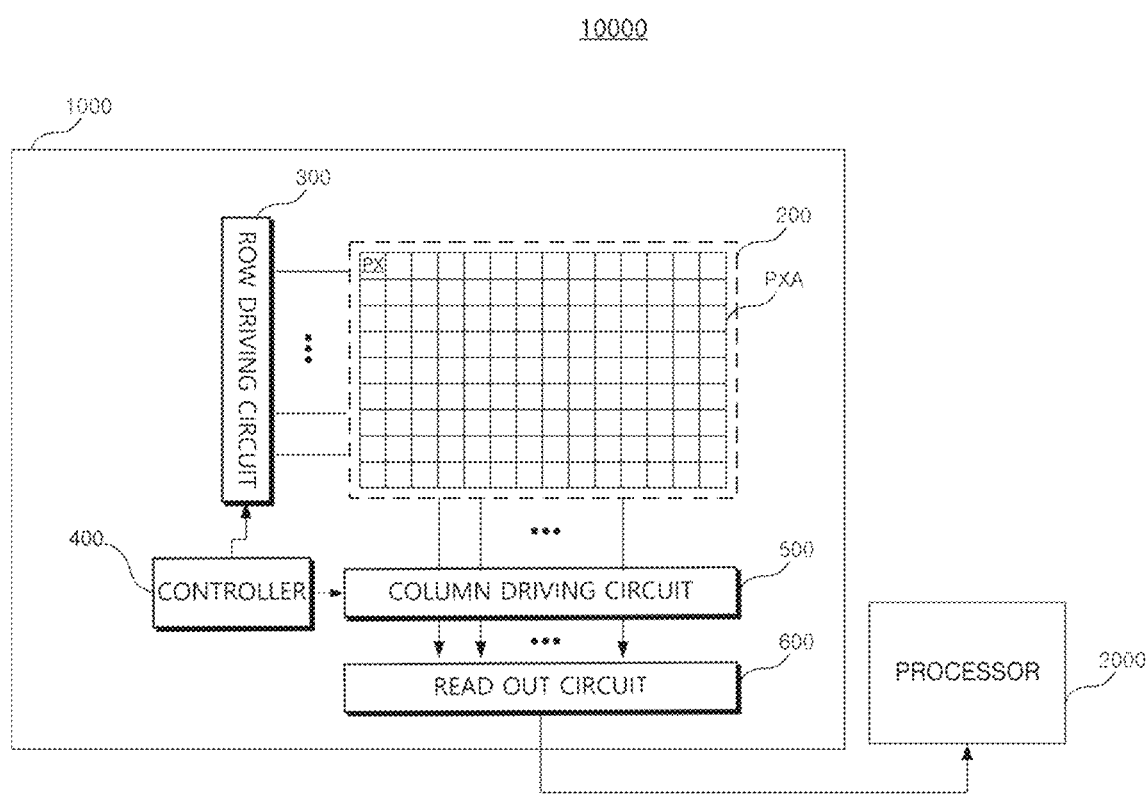
FIG. 13 is a block diagram of an image sensor according to an example embodiment.

FIG. 13 is a block diagram of an image sensor 10000 according to an example embodiment. Parts identical or similar to those described with reference to the previous drawings will be simply described or omitted to avoid redundancy.

Referring to FIG. 13, the image sensor 10000 includes the pixel array PXA, a row driving circuit 300, a controller 400, a column driving circuit 500, a read out circuit 600, and an image signal processor (ISP) 2000. The pixel array PXA includes at least one of image sensors according to example embodiments.

The pixel array PXA may include a plurality of unit pixels that are two-dimensionally arranged, and is formed in an active region 200.

Unit pixels of the pixel array PXA may provide output signals to the column driving circuit 500 one at a time in units of rows. The row driving circuit 300 provides a plurality of driving signals for driving unit pixels located in the same row to the pixel array PXA.

The unit pixel of the pixel array PXA may be any one of the pixels 100, 100a, 100b, 100c, 100d, 100e, and 100f described with reference to FIGS. 1 to 7.

The controller 400 controls the row driving circuit 300 and the column driving circuit 500, and for this purpose, the controller 400 provides control signals such as a clock signal and a timing control signal to the row driving circuit 300 and the column driving circuit 500.

Unit pixels belonging to the selected row provide image signals corresponding to incident light and reset signals to output lines of columns corresponding to respective pixels.

The column driving circuit 500 may include a correlated double sampling CDS that removes noise using an image signal and a reset signal, and may decode an address of the pixel array PXA in a column direction.

The read out circuit 600 may include an amplifier that amplifies an analog signal that is an output signal, an analog digital converter ADC that converts an analog signal into a digital signal, etc.

The image signal processing processor ISP may demosaic image signals according to pixel patterns by interpolation, etc., may perform color correction, may adjust dynamic range, or may reduce noise through filtering. The image signal processing processor ISP may additionally perform other methods of improving image quality.

Figure 14:
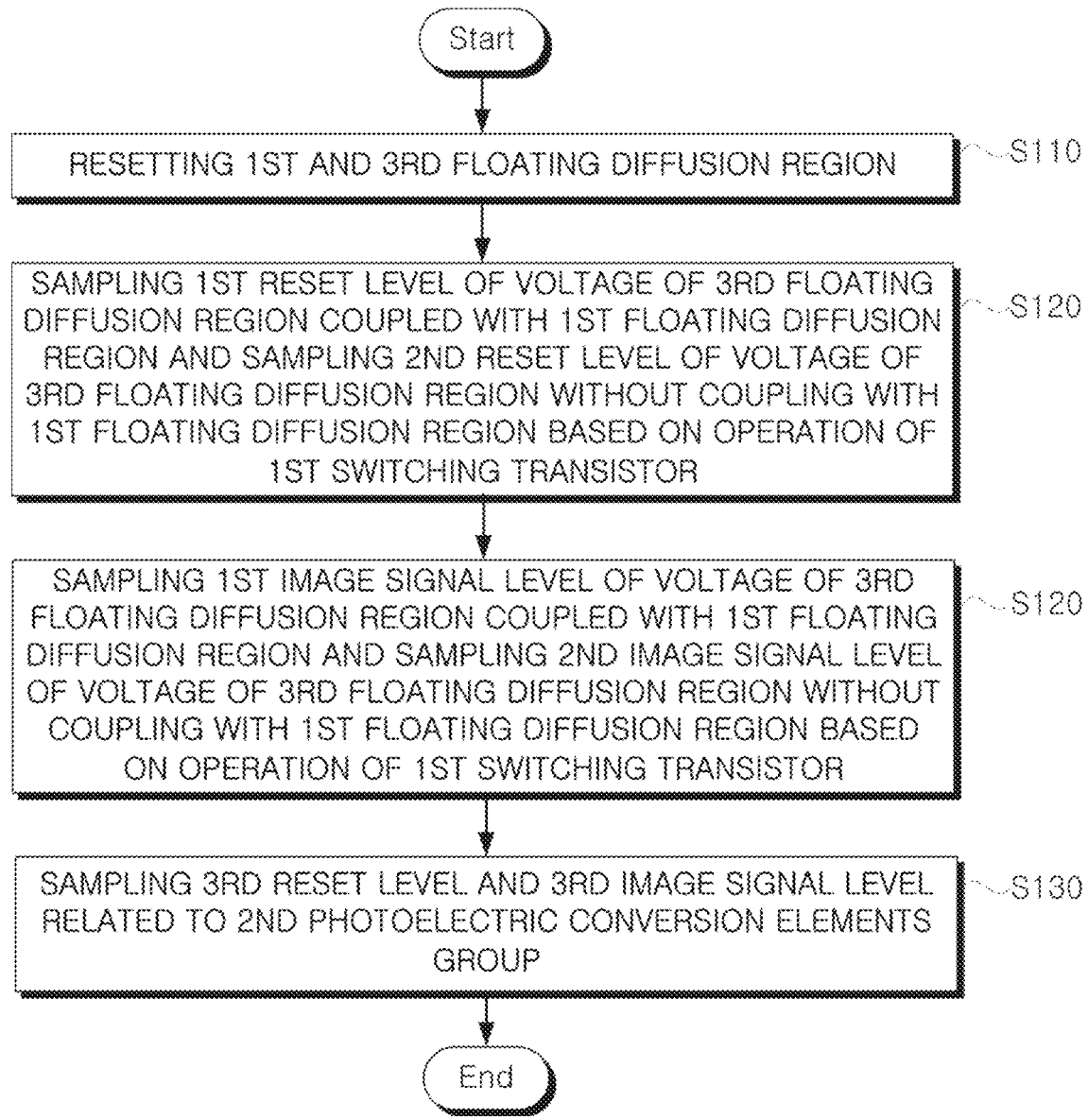
FIG. 14 is a flowchart illustrating an operation of an image sensor according to an example embodiment.

FIG. 14 is a flowchart of an operating method of the image sensor with one of pixels 100, 100a, 100b, 100c, 100d, 100e, and 100f described with reference to FIGS. 1 to 8 according to an example embodiment.

The image sensor with one of pixels 100, 100a, 100b, 100c, 100d, 100e, and 100f includes a pixel array in which a plurality of pixels are arranged. The pixel includes a plurality of photoelectric conversion element groups, a plurality of floating diffusion regions, the at least one driving transistor DX, the at least one selection transistor SEL, and the at least one reset transistor RS.

The pixel includes a first photoelectric conversion element group and a second photoelectric conversion element group, which include different numbers of photoelectric conversion elements. The pixel includes a first floating diffusion region and a second floating diffusion region respectively connected to the first photoelectric conversion element group and the second photoelectric conversion element group. The pixel includes a third floating diffusion region separated from the first floating diffusion region and the second floating diffusion region and connected to the gate of the driving transistor DX. The number of photoelectric conversion elements included in the first photoelectric conversion element group is greater than the number of photoelectric conversion elements included in the second photoelectric conversion element group.

The image sensor with one of pixels 100, 100a, 100b, 100c, 100d, 100e, and 100f resets the first floating diffusion region connected to the first photoelectric conversion element group through the transfer transistor LTG and the third floating diffusion region connected to the gate of the driving transistor DX (S110).

In a state in which the first switching transistor disposed between the first floating diffusion region and the third floating diffusion region is turned on, the image sensor with one of pixels 100, 100a, 100b, 100c, 100d, 100e, and 100f samples a first reset level of the voltage of the third floating diffusion region coupled to the first floating diffusion region, and in a state in which the first switching transistor is turned off, the image sensor samples a second reset level of the voltage of the third floating diffusion region not coupled to the first floating diffusion region (S120).

In detail, in the read-out mode of the first photoelectric conversion element group, a reset level in which the third floating diffusion region connected to the gate of the driving transistor DX is coupled to the first floating diffusion region and a reset level in which the first floating diffusion region is not connected to the third floating diffusion region are individually sampled.

The image sensor with one of pixels 100, 100a, 100b, 100c, 100d, 100e, and 100f turns off the first switching transistor in the first output period of the output mode of the image signal based on the charges generated by the first photoelectric conversion element group to sample the first image signal level of the voltage of the third floating diffusion region not coupled to the first floating diffusion region. The image sensor with one of pixel 100, 100a, 100b, 100c, 100d, 100e, and 100f turns on the first switching transistor in the second output period of the output mode of the image signal based on the charges generated by the first photoelectric conversion element group to sample the second image signal level of the voltage of the third floating diffusion region coupled to the first floating diffusion region (S120).

A conversion gain applied to the first image signal level may be greater than a conversion gain applied to the second image signal level. The first image signal level may be sampled in the HCG mode among read-out modes of the first photoelectric conversion element group, and the second image signal level may be sampled in the LCG mode among read-out modes of the first photoelectric conversion element group.

In detail, in the read-out mode of the first photoelectric conversion element group, the image signal level in which the third floating diffusion region connected to the gate of the driving transistor DX is coupled to the first floating diffusion region and the image signal level in which the third floating diffusion region is not coupled to the first floating diffusion region are individually sampled.

Accordingly, the first floating diffusion region in which charges are transferred from the plurality of photoelectric conversion elements through the transfer gate is separated from the third floating diffusion region in which the image signal level is output. As a result, in the read-out mode of the first photoelectric conversion element group, image signals of the HCG mode and the LCG mode may be separately sampled, and the dynamic range of the pixel may be improved.

The image sensor with one of pixel 100, 100a, 100b, 100c, 100d, 100e, and 100f samples a third reset level and a third image signal level associated with the second photoelectric conversion element group in a read-out mode of the second photoelectric conversion element group. (S130).

The first floating diffusion region and the second floating diffusion region respectively connected to the first photoelectric conversion element group and the second photoelectric conversion element group may be separated by the second switching transistor, and the second switching transistor may be turned off in the read-out mode of the first photoelectric conversion element group.

According to an example embodiment, the image sensor may improve a dynamic range.

While aspects of example embodiments have been particularly shown and described, it will be understood that various changes in form and details may be made therein without departing from the spirit and scope of the following claims.

What is claimed is:

1. An image sensor comprising:
a pixel array in which a plurality of pixels are arranged, wherein a first pixel of the plurality of pixels comprises:
a driving transistor;
a first switching transistor;
a first photoelectric conversion element group comprising a plurality of first photoelectric conversion elements;
a second photoelectric conversion element group comprising at least one second photoelectric conversion element;
a first floating diffusion region connected to the plurality of first photoelectric conversion elements through a first transfer transistor;
a second floating diffusion region connected to the at least one second photoelectric conversion element through a second transfer transistor;
a third floating diffusion region connected to a gate of the driving transistor, and separated from each of the first floating diffusion region and the second floating diffusion region by the first switching transistor; and
a reset transistor comprising a first end to which a reset voltage is applied and a second end connected to the third floating diffusion region,
wherein the driving transistor is configured to output an image signal based on a voltage of the third floating diffusion region through a selection transistor.

2. The image sensor of claim 1, wherein the first transfer transistor comprises a plurality of first transfer transistors,
wherein the plurality of first photoelectric conversion elements are respectively connected to the first floating diffusion region through the plurality of first transfer transistors.

3. The image sensor of claim 1, wherein a number of first photoelectric conversion elements in the first photoelectric conversion element group is greater than a number of second photoelectric conversion elements in the second photoelectric conversion element group.

4. The image sensor of claim 3, wherein the plurality of first photoelectric conversion elements and the at least one second photoelectric conversion element are exposed to incident light at a same time, and
wherein charges generated by the plurality of first photoelectric conversion elements and the at least one second photoelectric conversion element are variably applied for a conversion gain based on an illuminance of incident light.

5. The image sensor of claim 4, wherein the first transfer transistor comprises a plurality of first transfer transistors respectively connected to the plurality of first photoelectric conversion elements, and
wherein the plurality of first transfer transistors are controlled by a common control signal.

6. The image sensor of claim 5, wherein the second photoelectric conversion element group comprises a plurality of second photoelectric conversion elements.

7. The image sensor of claim 4, wherein the driving transistor is further configured to output the image signal based on a voltage of the second floating diffusion region coupled with the third floating diffusion region in a high conversion gain (HCG) mode of the first photoelectric conversion element group, and output the image signal based on a voltage of the first floating diffusion region and the second floating diffusion region, both of which are coupled with the third floating diffusion region, in a low conversion gain (LCG) mode of the first photoelectric conversion element group.

8. The image sensor of claim 4, wherein the first switching transistor is connected between the first floating diffusion region and the second floating diffusion region, and
wherein the image signal is output in a high conversion gain (HCG) mode of the first photoelectric conversion element group based on the first switching transistor being turned off, and the image signal is output in a low conversion gain (LCG) mode of the first photoelectric conversion element group based on the first switching transistor being turned on.

9. The image sensor of claim 3, wherein each of the plurality of first photoelectric conversion elements and each of the at least one second photoelectric conversion element have a common light receiving area.

10. The image sensor of claim 9, wherein the first photoelectric conversion element group and the second photoelectric conversion element group comprise different numbers of sub-pixels, and
wherein each of the sub-pixels comprises:
a photoelectric conversion element;
a transfer transistor; and
a transistor.

11. The image sensor of claim 10, wherein the transistor of at least one of the sub-pixels is configured as a dummy transistor.

12. The image sensor of claim 10, wherein the transistor of some of the sub-pixels is connected in parallel to each other, and
wherein the connected transistor in parallel is configured as the driving transistor.

13. The image sensor of claim 1, wherein the first pixel further comprises a second switching transistor between the first floating diffusion region and the second floating diffusion region.

14. The image sensor of claim 13, further comprising a capacitor connected to the second floating diffusion region.

15. The image sensor of claim 14, further comprising a third switching transistor between the capacitor and the second floating diffusion region,
wherein the driving transistor is further configured to output the image signal in a high conversion gain (HCG) mode of the second photoelectric conversion element group based on the third switching transistor being turned off, and output the image signal in a low conversion gain (LCG) mode of the second photoelectric conversion element group based on the third switching transistor being turned on.

16. The image sensor of claim 15, wherein the driving transistor is further configured to output the image signal based on a voltage of the third floating diffusion region in the HCG mode of the second photoelectric conversion element group, and output the image signal based on voltages of the third floating diffusion region in which the first floating diffusion region, the second floating diffusion region and the capacitor are coupled to in the LCG mode of the second photoelectric conversion element group.

17. A method of operating a pixel including a first photoelectric conversion element group and a second photoelectric conversion element group, a first floating diffusion region and a second floating diffusion region respectively connected to the first photoelectric conversion element group and the second photoelectric conversion element group, and a third floating diffusion region separated from the first floating diffusion region and the second floating diffusion region and connected to a gate of a driving transistor, wherein a number of photoelectric conversion elements in the first photoelectric conversion element group is greater than a number of photoelectric conversion elements in the second photoelectric conversion element group, the method comprising:

resetting the first floating diffusion region and the third floating diffusion region;

sampling a first reset level of a voltage of the third floating diffusion region while controlling a first switching transistor positioned between the first floating diffusion region and the third floating diffusion region to couple the first floating diffusion region and the third floating diffusion region;

sampling a second reset level of a voltage of the third floating diffusion region while controlling the first switching transistor to not couple the first floating diffusion region and the second floating diffusion region;

sampling a first image signal level of a voltage of the third floating diffusion region while controlling the first switching transistor to couple the first floating diffusion region and the third floating diffusion region in a first output period based on electric charge generated by the first photoelectric conversion element group;

sampling a second image signal level of a voltage of the third floating diffusion region while controlling the first switching transistor to not couple the first floating diffusion region and the third floating diffusion region in a second output period; and sampling a third reset level and a third image signal level associated with the second photoelectric conversion element group.

18. The method of claim 17, wherein the pixel includes a second switching transistor between the first floating diffusion region and the second floating diffusion region, and wherein the sampling of the first image signal level and the sampling of the second image signal level are performed while the second switching transistor is turned off.

19. The method of claim 17, wherein a conversion gain applied to the first image signal level is greater than a conversion gain applied to the second image signal level.

20. An electronic device comprising:

a pixel array in which a plurality of pixels are arranged; and a controller configured to transmit a control signal to a plurality of transistors in the plurality of pixels, and wherein a first pixel of the plurality of pixels comprises:

a driving transistor;

a first switching transistor;

a plurality of photoelectric conversion element groups comprising different numbers of photoelectric conversion elements;

a first floating diffusion region connected to a first photoelectric conversion element group through a first transfer transistor;

a second floating diffusion region connected to a second photoelectric group through a second transfer transistor;

a third floating diffusion region connected to a gate of the driving transistor, separated from the first floating diffusion region, separated from the second floating diffusion region, by the first switching transistor; and a reset transistor comprising a first end to which a reset voltage is applied and a second end connected to the third floating diffusion region, wherein the driving transistor is configured to output an image signal based on a voltage of the third floating diffusion region through a selection transistor.

\* \* \* \* \*